(12) United States Patent
Noji

(10) Patent No.: US 7,909,471 B2
(45) Date of Patent: Mar. 22, 2011

(54) REAR PROJECTION TYPE DISPLAY APPARATUS

(75) Inventor: Minoru Noji, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 11/744,342

(22) Filed: May 4, 2007

(65) Prior Publication Data
US 2007/0258056 A1 Nov. 8, 2007

(30) Foreign Application Priority Data

May 8, 2006 (JP) ................. 2006-129680

(51) Int. Cl.
*G03B 21/22* (2006.01)
(52) U.S. Cl. ............. 353/77; 353/78; 359/457; 359/460
(58) Field of Classification Search .................... 353/74, 353/77, 78; 359/443, 453, 460, 456, 457
See application file for complete search history.

(56) References Cited

U.S. PATENT DOCUMENTS
2007/0247594 A1* 10/2007 Tanaka ............................ 353/77

FOREIGN PATENT DOCUMENTS
JP         2005-173424         6/2005

* cited by examiner

*Primary Examiner* — Kevin Pyo
(74) *Attorney, Agent, or Firm* — Canon U.S.A., Inc. I.P. Divison

(57) ABSTRACT

A rear projection type display apparatus, comprises an output unit that modulates a light from a light source to output a projection light; an image formation unit that has one or more optical elements, and that subjects the projection light that is output from the output unit to form an image; a Fresnel screen that displays the projection light that is subjected to form an image; a light detection unit that is disposed at a position on which a reflected light from the Fresnel screen focuses, and that detects rays; and a control unit that controls an output of the projection light by the output unit based on the rays that are detected at the light detection unit.

5 Claims, 27 Drawing Sheets

F I G. 14A
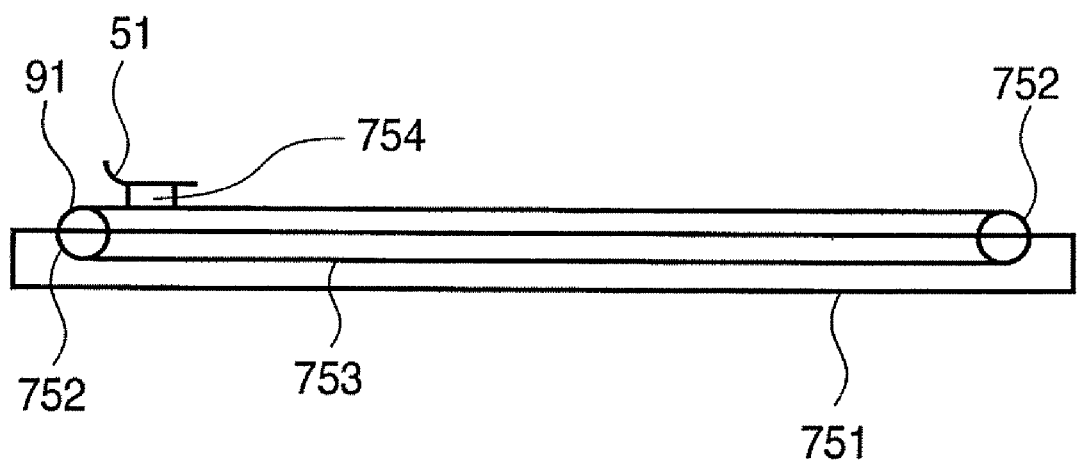

F I G. 16B
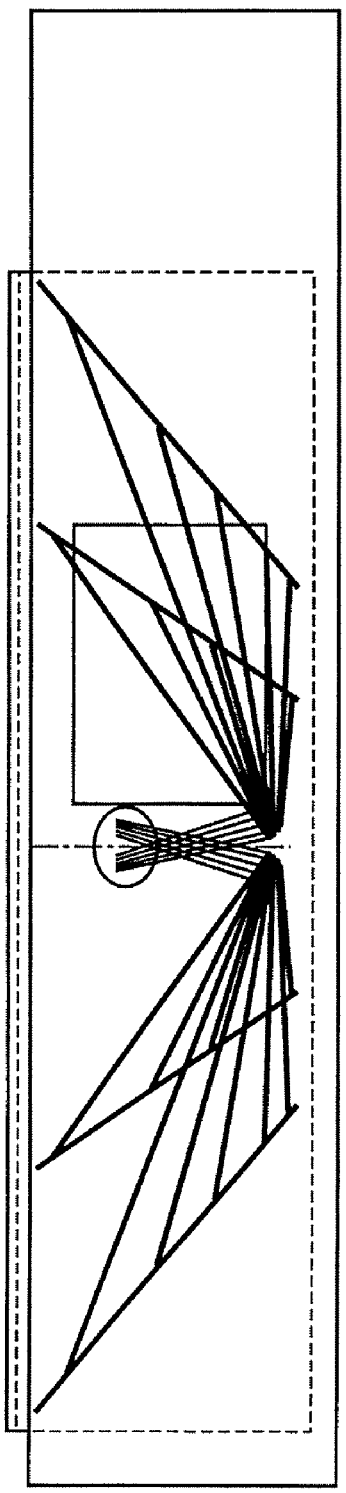

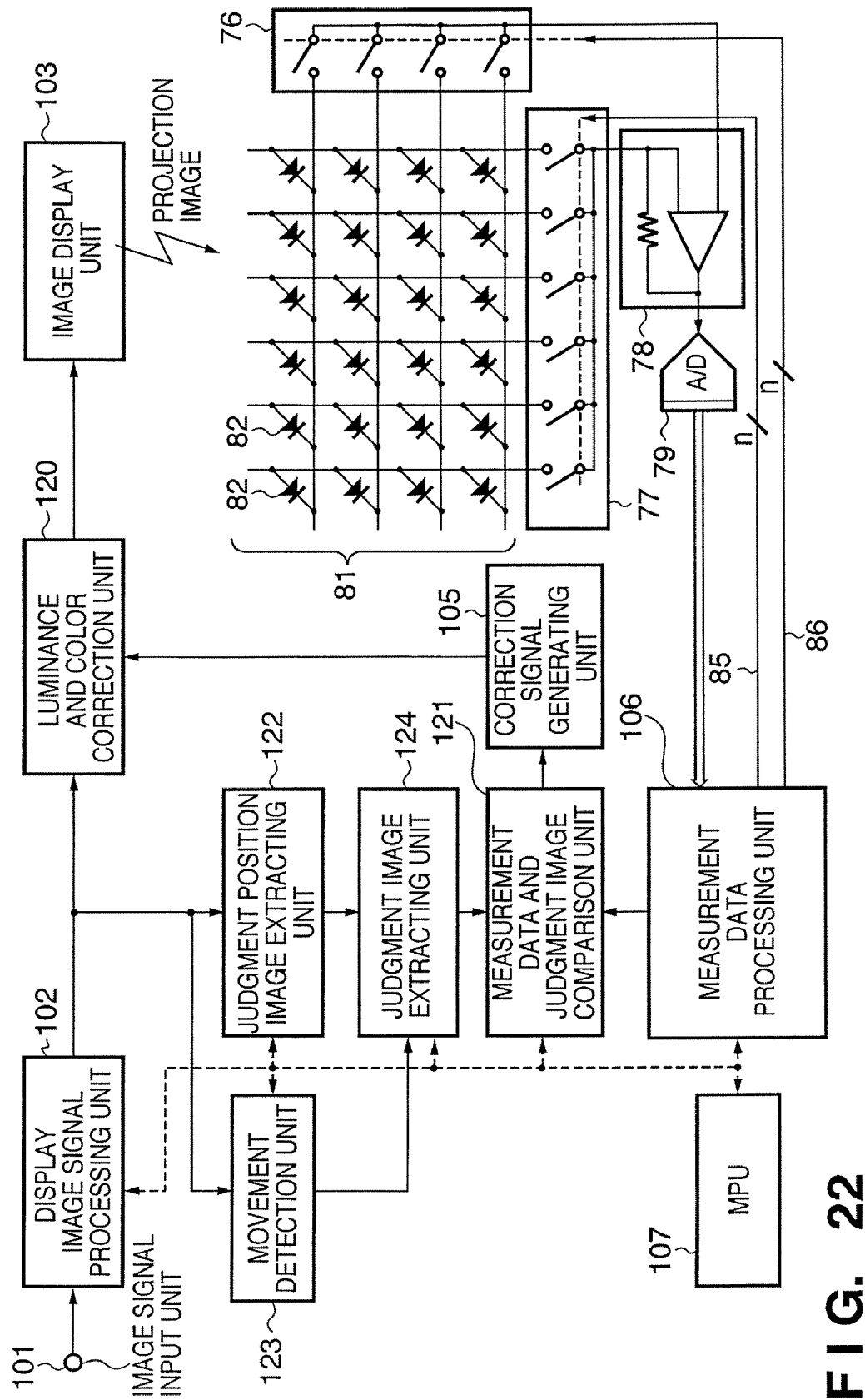
F I G. 22

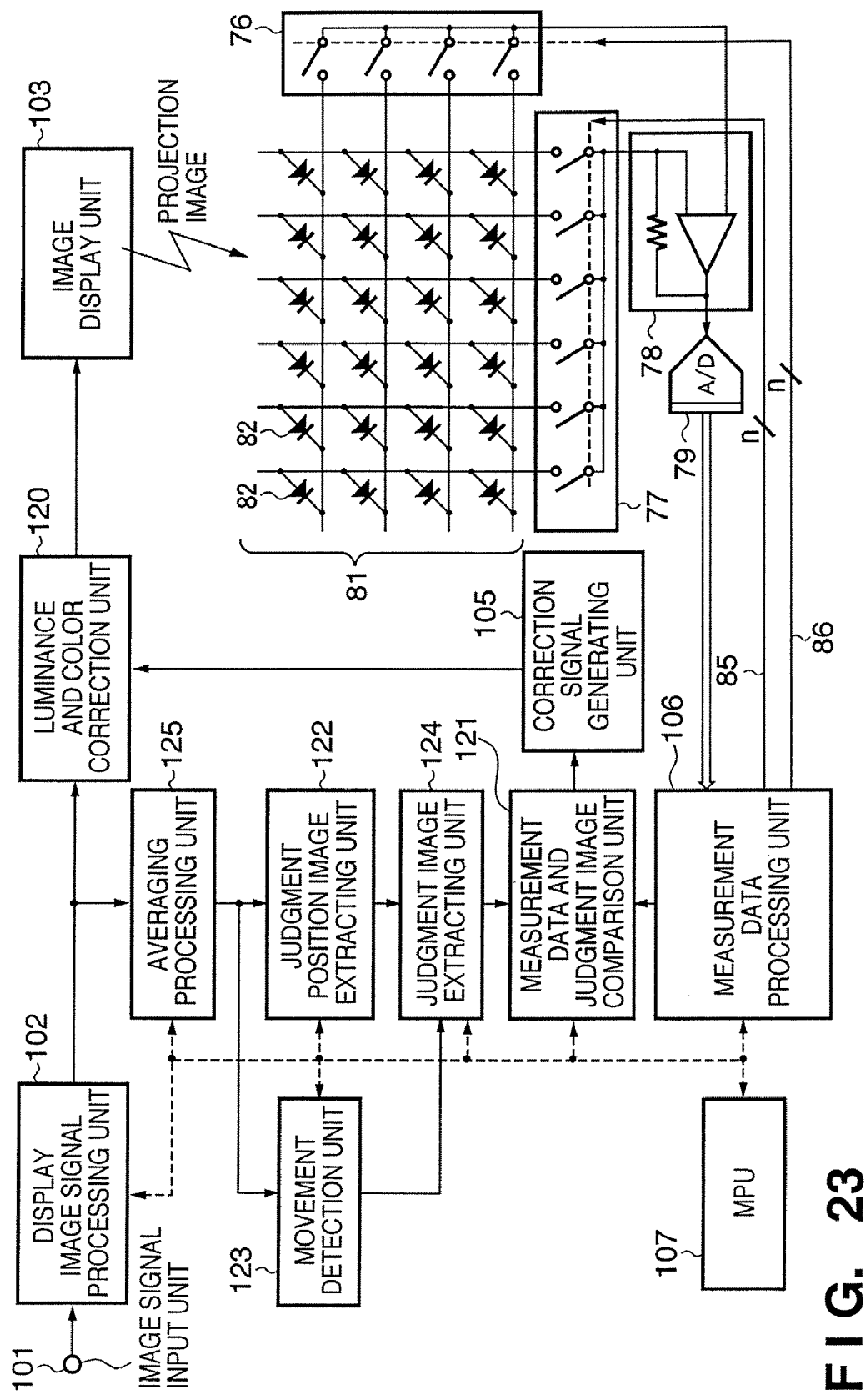
F I G. 23

REAR PROJECTION TYPE DISPLAY APPARATUS

BACKGROUND OF THE INVENTION

1. Field of the Invention

The present invention relates to a rear projection type display apparatus, and more particularly to technology that measures color reproduction characteristics to control image display characteristics.

2. Description of the Related Art

A rear projection type display apparatus is already known in which light receiving sensors for photometric adjustment are provided between a screen member and a projection apparatus (Japanese Patent Laid-Open No. 2005-173424). An outline of this arrangement will be described with reference to FIG. 24A, FIG. 24B, FIG. 25A and FIG. 25B.

FIG. 24A and FIG. 24B are views that show an outline of the arrangement of this kind of rear projection type display apparatus. FIG. 24A is a plan view of an upper notch of a rear projection type display apparatus 1, and FIG. 24B is a view for describing disposition positions of light receiving sensors at a time of photometric adjustment.

In this arrangement, as shown in FIG. 24A, mobile light receiving sensors 81 are disposed between a screen member 7 and a projection apparatus 9 inside an apparatus main unit 8. As shown in FIG. 24A and FIG. 24B, at the time of photometric adjustment the light receiving sensors 81 are moved to positions that are struck by projected light from the projection apparatus 9 to receive the light from the projection apparatus 9. Light that is subjected to photometry at the light receiving sensors 81 is input to a control unit (not shown) and data processing with respect to the level of symmetry of luminance and hue is performed. The luminance and hue are then adjusted based on the data processing results of the control unit. In this connection, movement of the light receiving sensors 81 can be performed manually or electrically.

FIG. 25A and FIG. 25B are state views that show disposition positions of the light receiving sensors 81 at a time of normal use. FIG. 25A is a plan view of an upper notch of the projector apparatus 1 at a time of normal use, and FIG. 25B is a view for describing disposition positions of the light receiving sensors 81 at the time of normal use. As shown in FIG. 25A and FIG. 25B, at a time of normal use of the rear projection type display apparatus 8, the light receiving sensors 81 are moved to positions which are not struck by projection light from the projection apparatus 9 to prevent the light receiving sensors 81 obstructing the light from the projection apparatus 9. As described above, movement of the light receiving sensors 81 can be performed manually or electrically.

However, in the above described arrangement, measurement can only be carried out at the periphery of the screen, and in that condition it is difficult to perform measurement for the entire screen or for an arbitrary position on the screen. In particular, in a thin rear projection apparatus with a large screen or the like, if sensor positions are designed to be movable there is a possibility that the sensors will collide due to dimensional and structural constraints, and realization thereof is difficult.

Therefore, according to the conventional arrangement, due to factors such as the light source and display device of the rear projection apparatus, it is difficult to measure color reproduction characteristics including the luminance, tone and color temperature of a display image across the whole of the display area. Accordingly, a user or a service person cannot appropriately correct inconsistencies in the display without using an external measurement apparatus.

SUMMARY OF THE INVENTION

The present invention was made in view of the above described problems, and an object of the present invention is to provide technology that, for a rear projection type display apparatus, measures luminance and color reproduction characteristics for arbitrary positions on a display screen to enable control of display characteristics based on the measurements.

According to one aspect of the present invention, a rear projection type display apparatus, comprises an output unit that modulates a light from a light source to output a projection light; an image formation unit that has one or more optical elements, and that subjects the projection light that is output from the output unit to form an image; a Fresnel screen that displays the projection light that is subjected to form an image; a light detection unit that is disposed at a position on which a reflected light from the Fresnel screen focuses, and that detects rays; and a control unit that controls an output of the projection light by the output unit based on the rays that are detected at the light detection unit.

According to another aspect of the present invention, a rear projection type display apparatus, comprises an output unit that modulates a light from a light source to output a projection light; an image formation unit that has one or more optical elements, and that subjects the projection light that is output from the output unit to form an image; a Fresnel screen that displays the projection light that is subjected to form an image; a mirror that is disposed at a position on which a reflected light from the Fresnel screen focuses; a light detection unit that detects rays that are reflected by the mirror; and a control unit that controls an output of the projection light by the output unit based on the rays that are detected at the light detection unit.

According to still another aspect of the present invention, a rear projection type display apparatus, comprises an output unit that modulates a light from a light source to output a projection light; an image formation unit that has one or more optical elements, and that subjects the projection light that is output from the output unit to form an image; a Fresnel screen that displays the projection light that is subjected to form an image; a mirror that is disposed in the vicinity of a surface that is irradiated by the projection light of the Fresnel screen; a moving unit that is capable of moving the mirror in a horizontal direction and/or a vertical direction; a light detection unit that detects rays that are reflected by the mirror; and a control unit that controls an output of the projection light by the output unit based on the rays that are detected at the light detection unit.

According to yet another aspect of the present invention, a rear projection type display apparatus, comprises an output unit that modulates a light from a light source to output a projection light; an image formation unit that has one or more optical elements, and that subjects the projection light that is output from the output unit to form an image; a Fresnel screen that displays the projection light that is subjected to form an image; a light detection unit that is disposed in the vicinity of a surface that is irradiated by the projection light of the Fresnel screen, and that detects rays of the projection light; and a control unit that controls an output of the projection light by the output unit based on the rays that are detected at the light detection unit.

Further features of the present invention will become apparent from the following description of exemplary embodiments with reference to the attached drawings.

BRIEF DESCRIPTION OF THE DRAWINGS

FIG. 14A is a view showing the configuration of a horizontal carriage and a vertical carriage;

FIG. 16B is a schematic diagram that illustrates the structure of a rear projection type display apparatus;

FIG. 22 is a circuit configuration diagram that shows a circuit configuration for correcting display characteristics;

FIG. 23 is a circuit configuration diagram that shows a circuit configuration for correcting display characteristics;

DESCRIPTION OF THE EMBODIMENTS

Hereunder, embodiments of the present invention are described in detail with reference to the attached drawings. However, the components described in these embodiments are for the purpose of exemplification, and it is not intended to limit the scope of the present invention only to these components. Further, with regard to all the figures of the following embodiments, the same symbols are assigned to the same or corresponding parts.

First Embodiment

According to the present embodiment, a configuration is described which acquires information relating to an image display utilizing the reflected light of a Fresnel screen, and controls image display characteristics based on that information.

Figure 1:
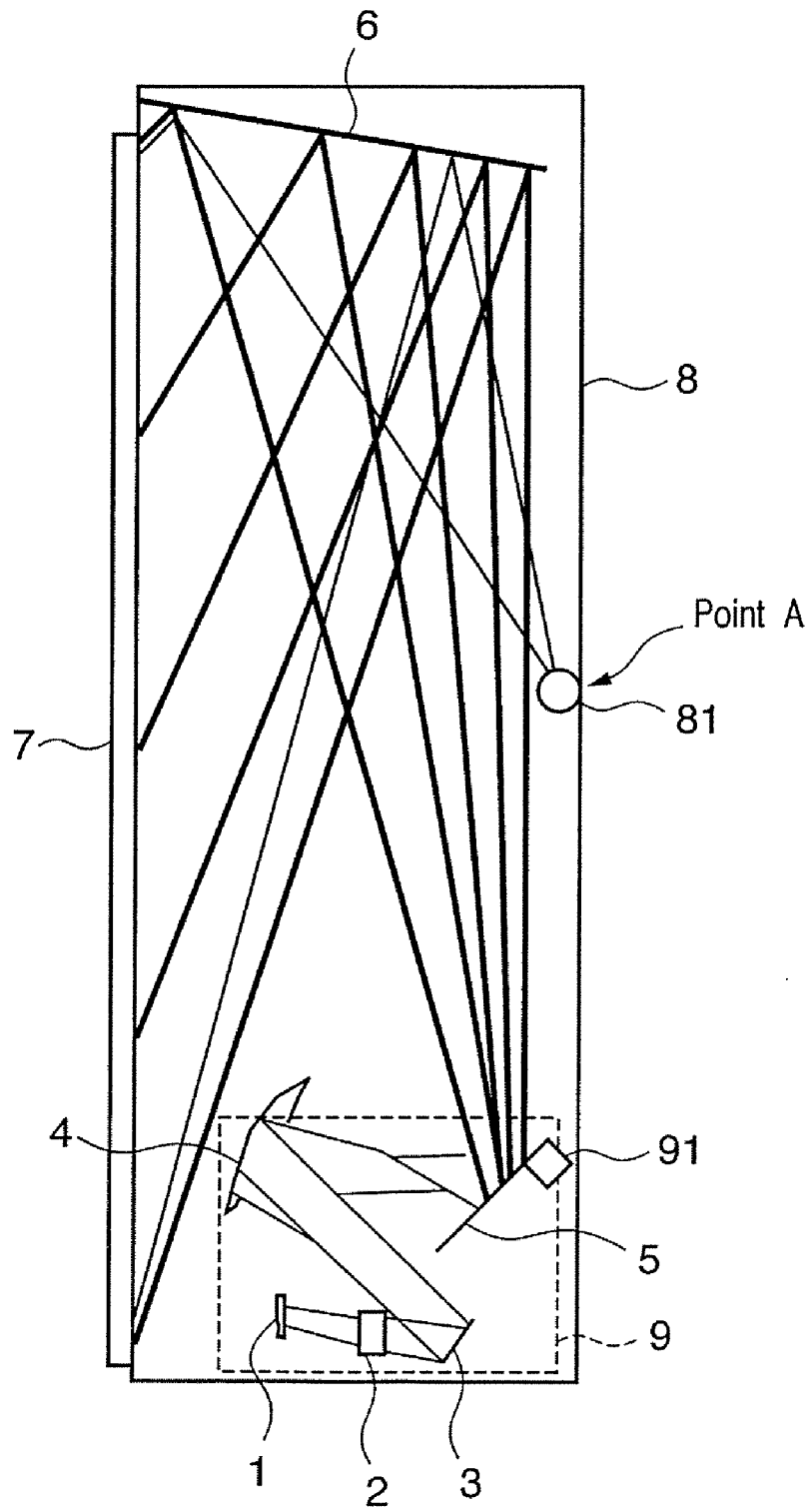
FIG. 1 is a schematic diagram that illustrates the structure of a rear projection type display apparatus.

FIG. 1 is a schematic diagram showing the structure of a rear projection type display apparatus according to the first embodiment. As shown in FIG. 1, the rear projection type display apparatus comprises the following components:

a reflection type display device (output unit) 1;
a color synthesizing prism 2;
an (image) projection unit 9;
a first mirror 3, a second mirror 4, a third mirror 5, and a fourth mirror 6;
a screen unit 7;
a body unit 8;
a light sensor unit (light detection unit) 81; and
an actuator 91.

As shown in FIG. 1, the reflection type display device 1, the color synthesizing prism 2, the first mirror 3, the second mirror 4, the third mirror 5, and the actuator 91 are in the projection unit 9. The color synthesizing prism 2 and the mirrors 3 to 6 constitute an image formation unit as optical elements.

Figure 2:
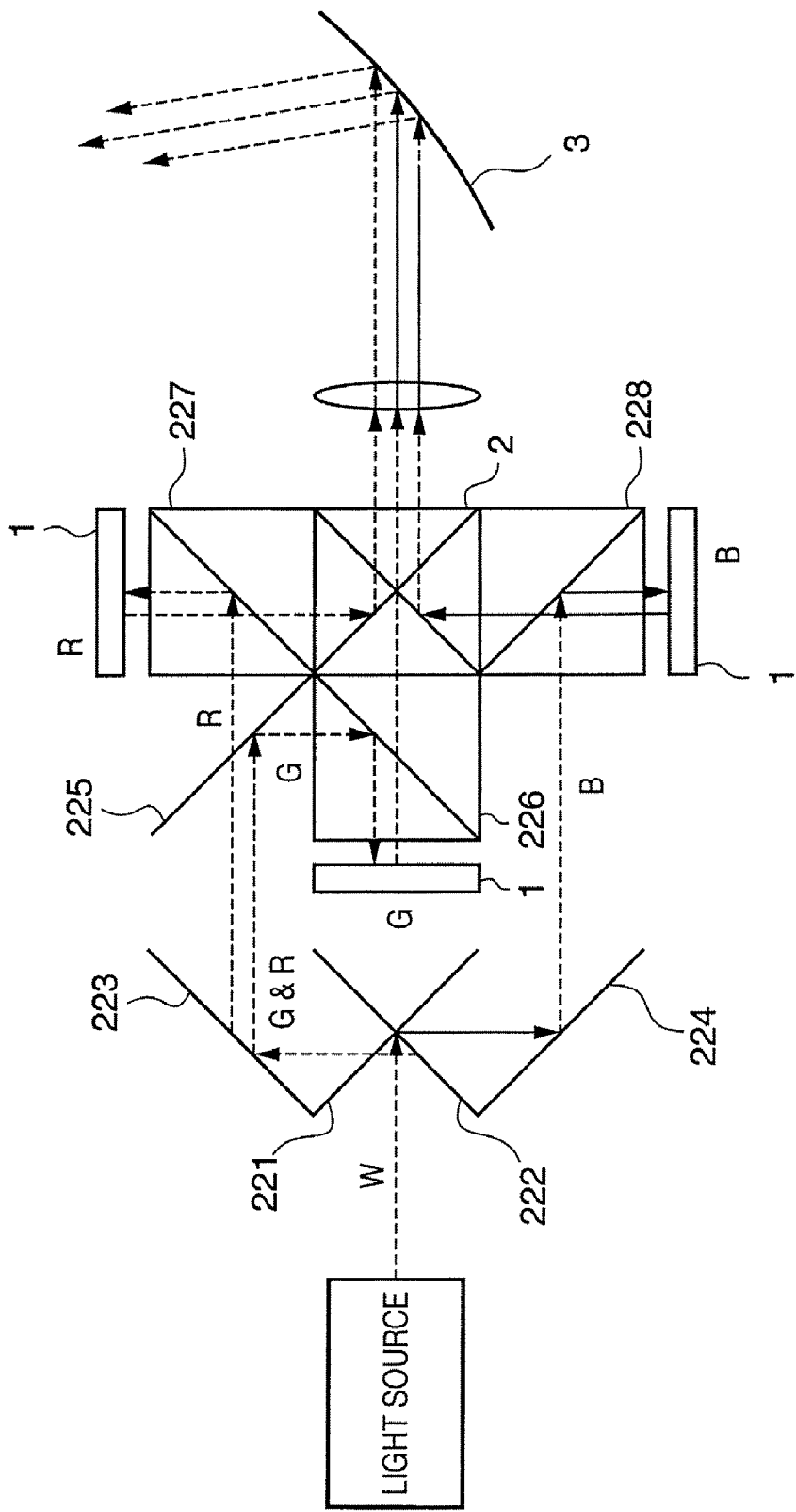
FIG. 2 is a schematic diagram that illustrates the detailed configuration of a reflection type display device, a color synthesizing prism, and a first mirror.

FIG. 2 is a schematic diagram that shows a detailed configuration of the reflection type display device 1, the color synthesizing prism 2, and the first mirror 3 that are included in the projection unit 9.

As shown in FIG. 2, in the projection unit 9, a light flux W (white) from a light source is separated into color light fluxes of blue light B and green and red (G & R) by two dichroic mirrors 221 and 222 that are combined to form a cross. The B light changes its optical path at a total reflection mirror 224, and after falling on a beam splitter 228 to undergo polarization, is subjected to light modulation at a reflective liquid crystal display panel 1. The thus-modulated blue light then falls on a light synthesizing prism 2.

The green and red (G & R) light that is reflected by the dichroic mirror 222 falls on a dichroic mirror 225 via a mirror 223. However, the dichroic mirror 225 has a property that allows only the red light to pass therethrough and reflects the green light (G).

After the red light that passes through the dichroic mirror 225 is incident on a beam splitter 227 and is polarized, it is subjected to light modulation at a reflective liquid crystal display panel 1. Thereafter, the modulated red light falls on the light synthesizing prism 2.

The green light (G) that is reflected by the dichroic mirror 225 is polarized by a beam splitter 226, and is then subjected to light modulation at a reflective liquid crystal display panel 1. Thereafter, the modulated green light falls on the light synthesizing prism 2.

At the light synthesizing prism 2, the image light fluxes of red, green, and blue (R, G, B) that underwent light modulation at the respective reflective liquid crystal panels 1 are synthesized to form a color image. The light flux of the color image that is synthesized at the light synthesizing prism 2 is incident onto a first reflection mirror 3 of an optical system for projection. Thereafter, the light flux is reflected by a fourth mirror 6 via the subsequent second reflection mirror 4 and the third reflection mirror 5 and forms an image on the screen 7. As a result, the transmitted projection image is projected onto the display surface. A characteristic feature of the configuration according to the present embodiment is that it is possible to control the angle of reflection of the third reflection mirror 5 using the actuator 91.

According to the above described configuration, the respective image lights corresponding to three colors from the respective display devices 1 for red, green, and blue are synthesized by the color synthesizing prism (optical system) 2, and form an image from the reflection type display device 1 by being projected onto the screen 7 via the aforementioned optical path.

Figure 3:
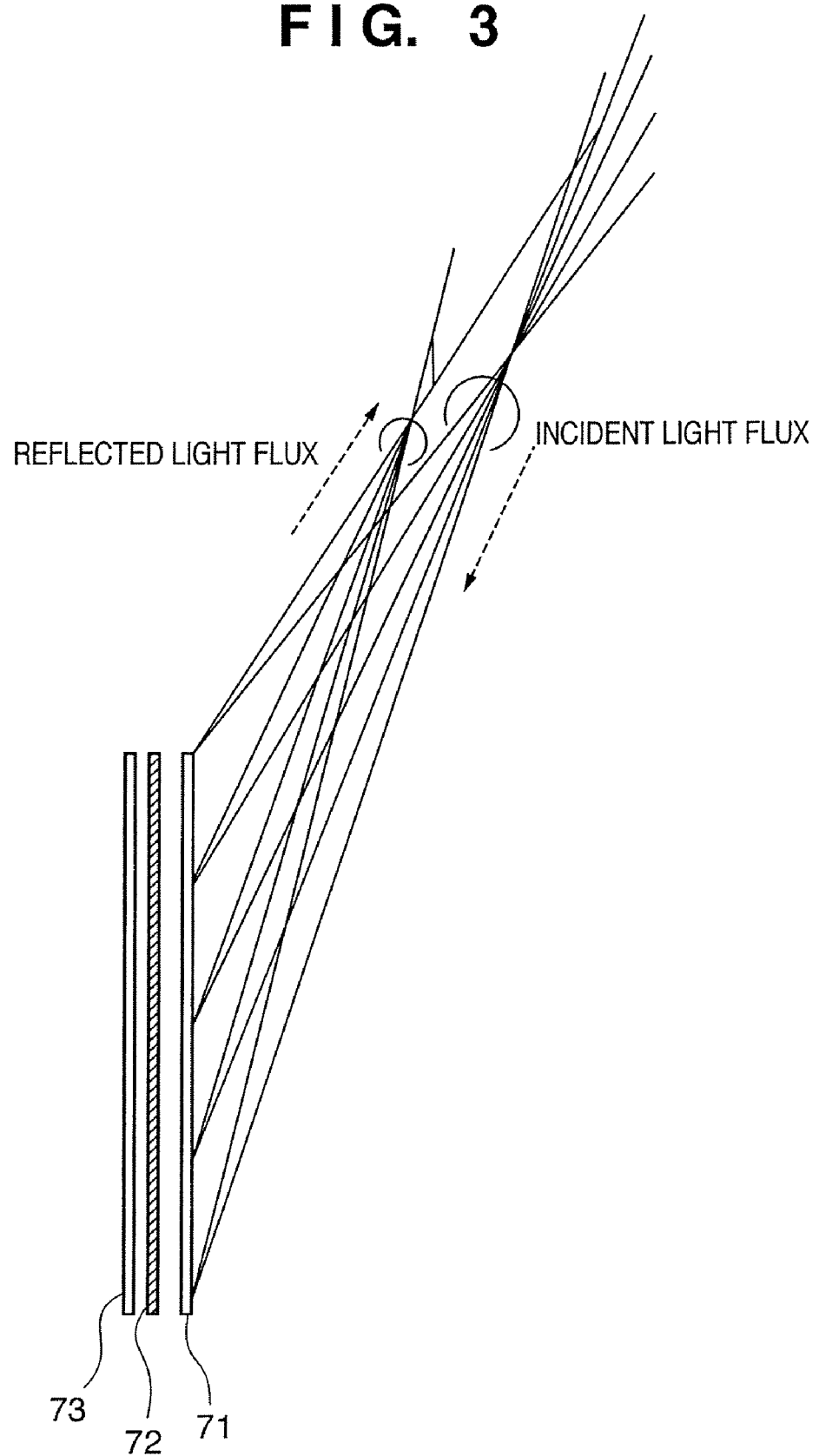
FIG. 3 is a view that schematically illustrates incident light and reflected light on a screen.

FIG. 3 is a view that schematically illustrates incident light and reflected light at the screen 7. As shown in FIG. 3, the screen is constituted by arranging a Fresnel lens plate (Fresnel screen) 71, a lenticular plate 72, and depending on the case, a transparent member for reinforcement 73 such as glass or an acrylic material in an overlaid condition. Thus the strength of the screen is maintained and warping or the like of the screen is prevented.

Figure 4:
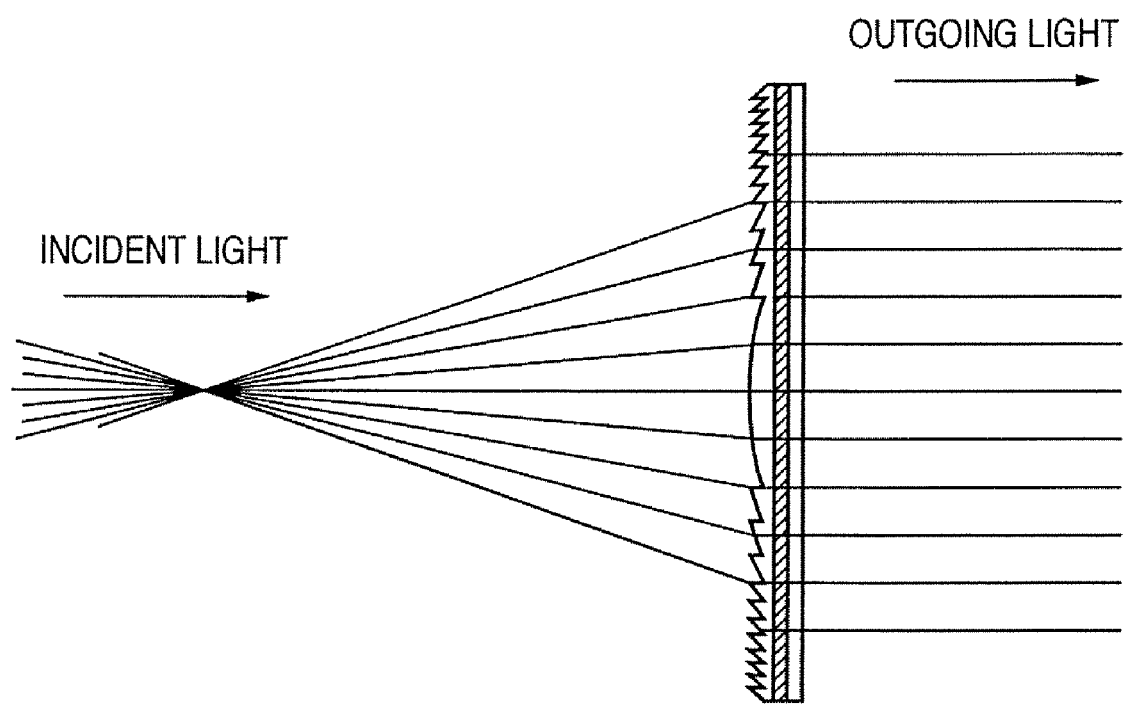
FIG. 4 is a view showing a cross section of a typical Fresnel lens.
Figure 5:
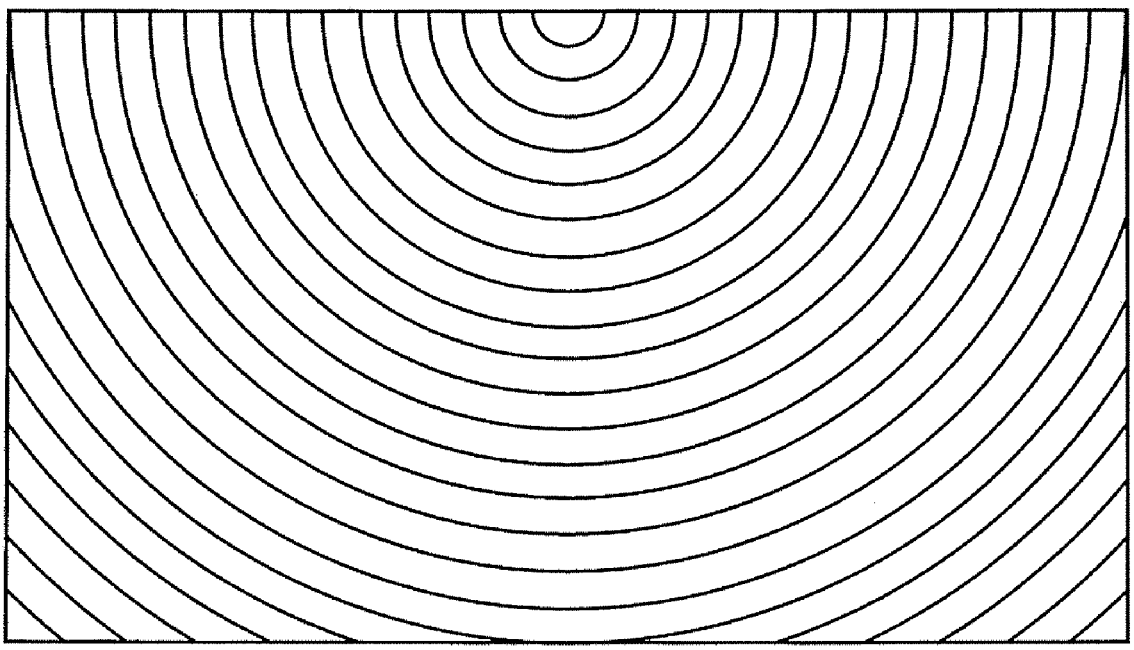
FIG. 5 is an image view that illustrates an outline of the disposition of lens grooves from the front of the Fresnel lens.

FIG. 4 is a view showing a cross section of a typical Fresnel lens. As shown in FIG. 4, at the Fresnel screen 71 a projection image (incident light) is irradiated outward as substantially parallel light rays in the direction of the front surface of the display apparatus. The lenticular plate 72 has properties that cut off external light and diffuse the projection image, and has an effect that improves the contrast and brightness of a display image and an effect that ensures the viewing angle. In the present embodiment, since the Fresnel lens 71 comprises a thin body, an incident image light flux falls on the screen 7 at a sharp angle. Therefore, as shown in FIG. 5, a configuration is used in which the optical axis is staggered. FIG. 5 is an image view that illustrates an outline of the disposition of lens grooves from the front of the Fresnel lens 71.

An image corresponding to light that is diagonally incident as described above is irradiated outward toward the front surface by the Fresnel lens 71 and is displayed on the screen surface via the lenticular plate 72. In this connection, from the Fresnel lens 71 are output an image light that is incident thereon and passes therethrough and an image light that is reflected slightly in the direction of incidence. As shown in FIG. 3, this image light has a property that focuses to some degree for a fixed distance. According to the configuration of the present embodiment, as shown in FIG. 1, reflected light of the screen 7 is reflected by the mirror 6 to focus on a point A in FIG. 1.

Therefore, according to the configuration of the present embodiment, a point photometric sensor 81 is provided at the position of the point A in FIG. 1. The point photometric sensor 81 is constituted by disposing sensors for R, G, B, and W for luminance measurement in close proximity to each other.

Figure 6:
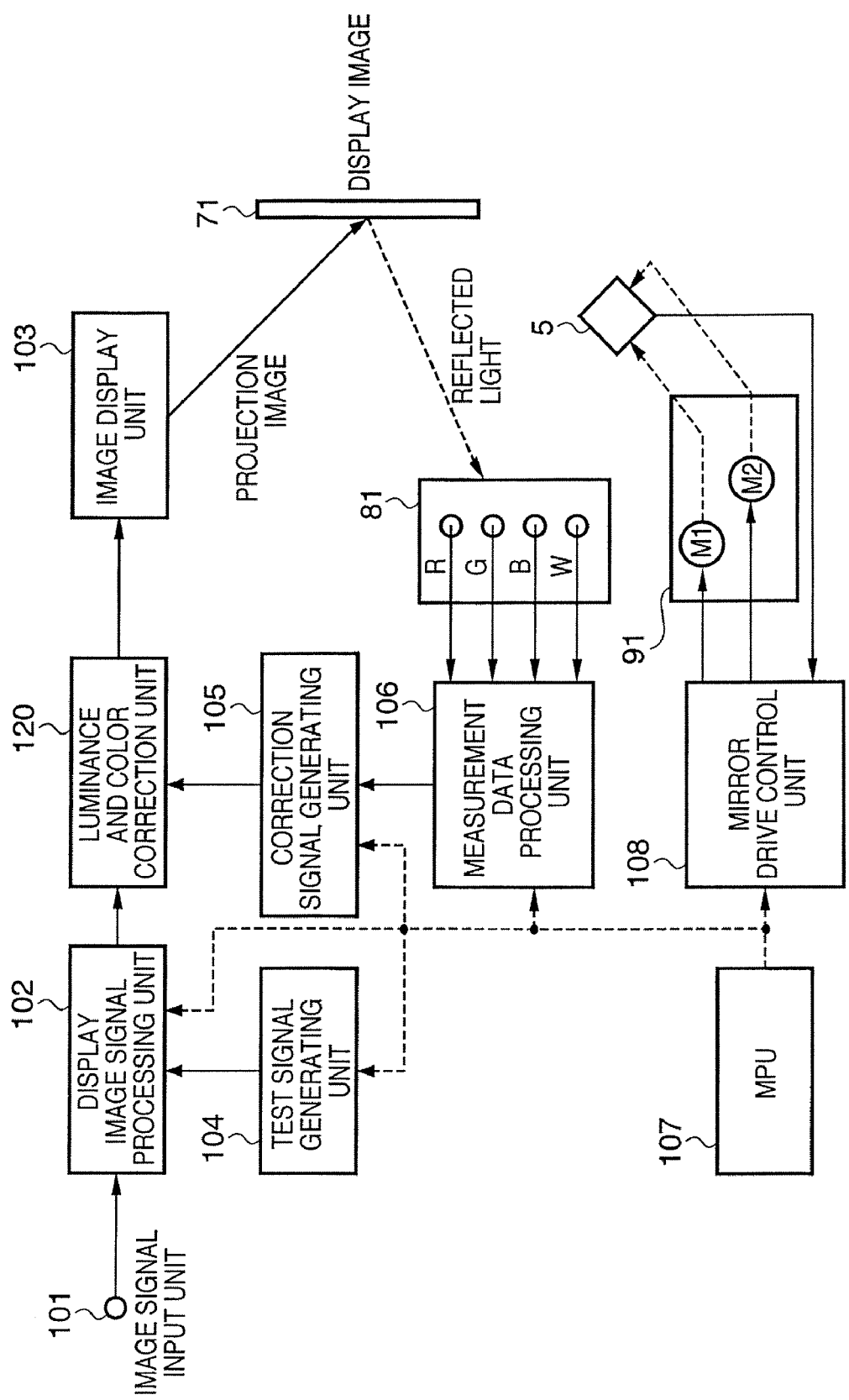
FIG. 6 is a circuit block diagram that shows a signal processing circuit configuration for image display and measurement.

According to the configuration of the present embodiment, measurement of the luminance, chromaticity and the like of an image is performed on the basis of reflected light that is detected by the point photometric sensor 81. FIG. 6 is a circuit block diagram that shows a signal processing circuit configuration for image display and measurement according to the present embodiment.

In FIG. 6, reference numeral 101 denotes an image signal input unit into which image signals corresponding to an image to be displayed are input. Reference numeral 102 denotes a display image signal processing unit, and reference numeral 120 denotes a luminance and color correction unit. An input signal to the image signal input unit 101 is described hereunder as a digital signal. In the case of an analog image signal, the image signal undergoes A/D conversion at the display image signal processing unit 102, and thereafter is handled as digital data. Reference numeral 103 denotes an image display unit. Reference numeral 104 denotes a test signal generating unit. Reference numeral 105 denotes a correction signal generating unit. Reference numeral 106 denotes a measuring unit and measurement data processing unit. Reference numeral 107 denotes a microcontroller (hereunder, referred to as "MPU") unit. Reference numeral 108 denotes a mirror drive control unit. Reference numeral 81 denotes the aforementioned photometric sensor. Reference numeral 91 denotes an actuator.

Figure 7:
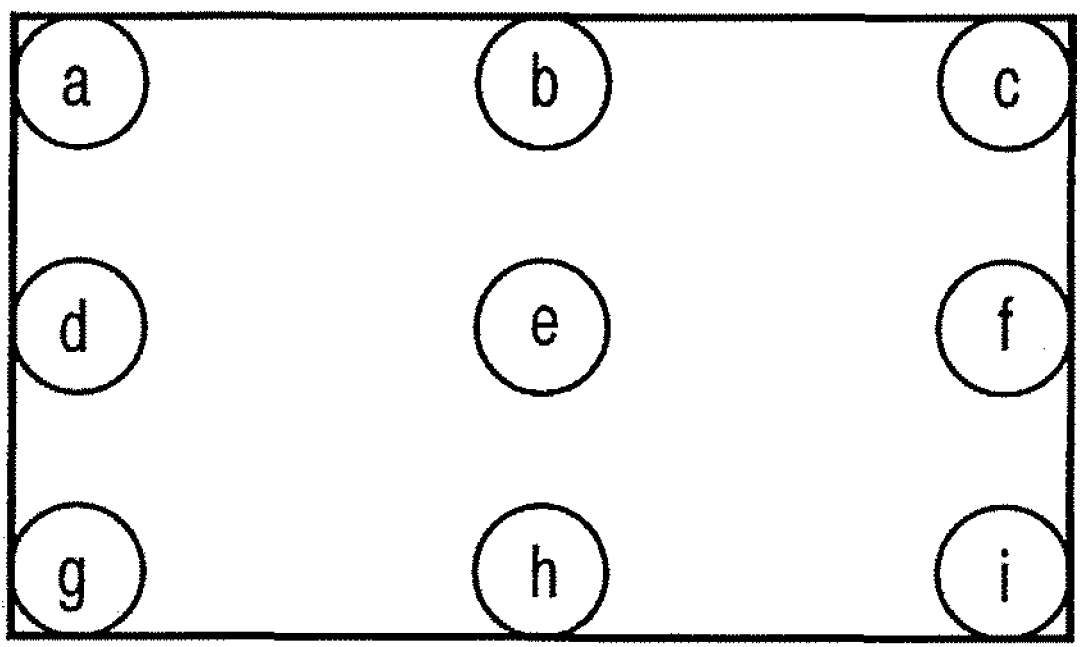
FIG. 7 is a view showing examples of measuring points of a projection image.

Normally, an image signal that corresponds to an image to be displayed is input into the image signal input unit 101, and the display image signal processing unit 102 and the luminance and color correction unit 120 drive the image display unit 103 to carry out image display based on the input image signal. More specifically, an image is projected on the screen unit 7 by the projection optical system as described using FIG. 1. In the case of a measurement mode, the signal switches to an image signal from the test signal generating unit 104 to input a test signal into the display image signal processing unit 102. A test image is projected on the screen unit 7 and at the same time, as described above, a reflection image that is reflected from the screen unit 7 is focused on the photometric sensor 81 provided at the point A on the rear surface. Thus, the photometric sensor 81 can measure the center of the image. FIG. 7 is a view illustrating a case in which the number of measuring points for a projection image is taken as nine points, and these points are denoted by reference characters a to i. In a normal projection display state, the reflected light of point e in FIG. 7 that corresponds to the center of the image is measured by the photometric sensor 81.

Next, a measurement value that was measured by the photometric sensor 81 undergoes data processing at the measuring unit and measurement data processing unit 106 and then input to the correction signal generating unit 105. Similarly, the MPU 107 performs control in a predetermined order (for example, e→d→a→b→c→f→i→h→g) to drive the actuator 91 by means of drive signal output from the mirror drive control unit 108 to oscillate the mirror 5 in a two-dimensional direction. By oscillating the mirror 5 in this manner, measurement is also possible for each of the points a, b, c, d, f, g, h, and i shown in FIG. 7. Further, the sensor output from the photometric sensor 81 is converted in sequence into suitable data for generating a correction signal at the measurement data processing unit 106, and the correction signal is generated at the correction signal generating unit 105 and supplied to the luminance and color correction unit 120. It is thereby possible to correct the white balance and inconsistencies in the color tones and luminance and the like of the display image.

When performing the above described measurement, at the test signal generating unit 104 or the display image signal processing unit 102, by making one portion or all of an image other than a luminance and color correction unit measuring point into a black image or the like, it is possible to prevent generation of a measurement error due to reflection of a projection image at an unintended portion.

Figure 8:
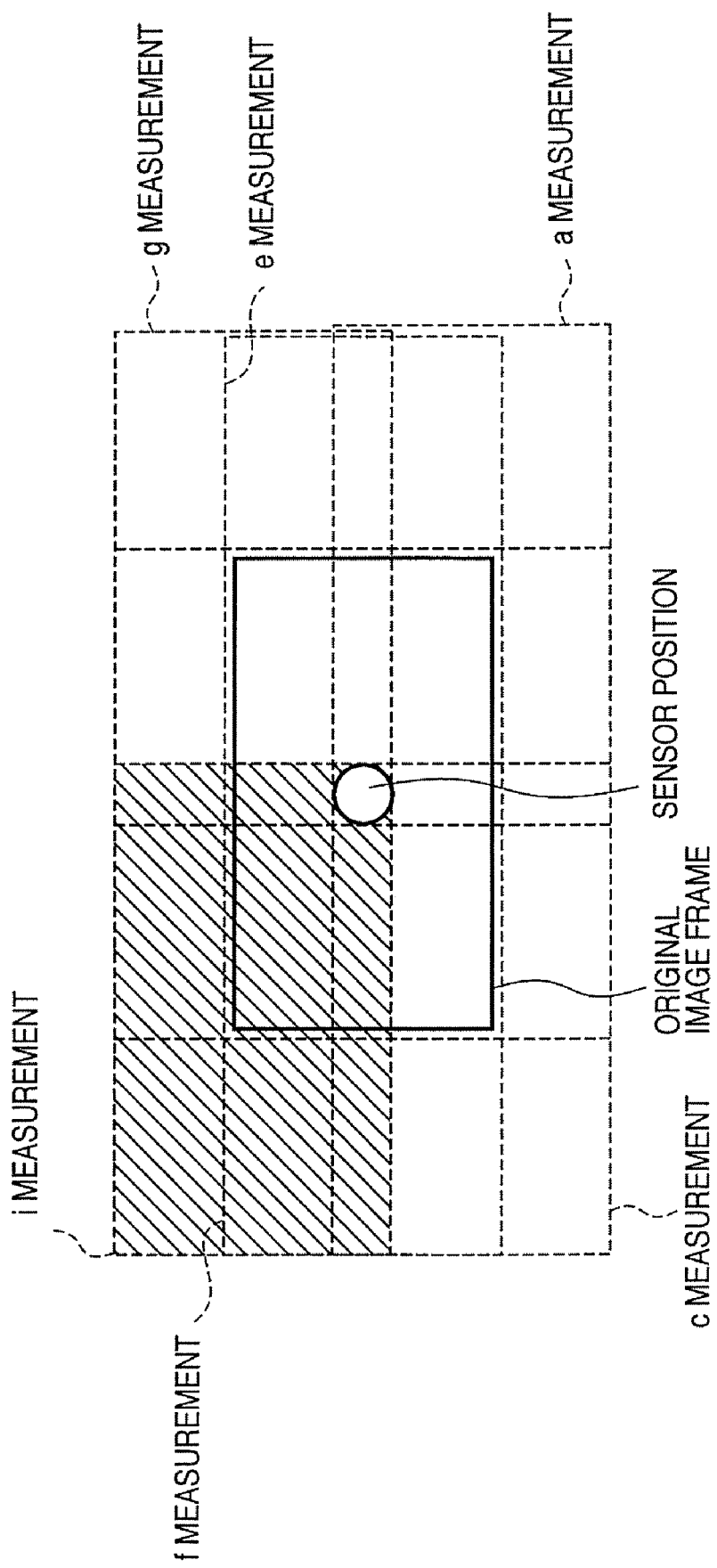
FIG. 8 is a view that illustrates the relation between the measurement area of a display image and a projection image.

FIG. 8 is a view that illustrates the relation between the measurement area of a display image and a projection image. For example, when performing measurement for the i point in FIG. 7, the relation is that between a measuring point (sensor position) as shown in the i measurement (diagonally shaded zone) of FIG. 8 and the projection position and, for example, a black display can be realized for at least a portion outside the frame of the original image shown in FIG. 8. In this case, as long as the photometric sensor 81 comprises at least a sensor for measuring the luminance of W, luminance can be measured on the basis of photometry. In this case, the respective data processing can be performed at the measurement data processing unit 106.

Further, for example, a configuration can also be adopted which uses a single photometric sensor such as the sensor for W to perform measurement by switching a projection test chart at the time of measurement between red, green, and blue in sequence, and then performs the respective data processing at the measurement data processing unit 106. Alternatively, the apparatus can be configured to perform measurement with a high degree of accuracy, or by simultaneous incorporation of sensor output, using dedicated photometric sensors for each of the colors R, G, and B.

Naturally, a configuration may also be adopted in which, instead of a test signal from the test signal generating unit 104, a test signal from outside is input into the image signal input unit 101 and measured. Further, although not illustrated in the figure, a configuration may also be adopted in which, after subjecting output from the photometric sensor 81 to a predetermined signal processing, the processed signal is output to an external information processing apparatus such as a PC (personal computer) by a signal output terminal to generate a correction signal at the information processing apparatus. More specifically, a configuration may be adopted in which a signal is input to a correction signal generating unit of the display apparatus via a communication cable from the information processing apparatus or via a memory medium or the like. A similar effect can be obtained with this configuration also.

As described above, according to the configuration of the present embodiment, it is possible to detect a ray at an arbitrary point on the display surface of a Fresnel screen that receives a light irradiated from one point, by taking into consideration the emission of reflected light that concentrates at one point and providing sensors in the vicinity of that point of concentration. It is therefore possible according to the configuration of the present embodiment to suitable control the display characteristics of an image on the basis of a ray at an arbitrary point on a display surface.

In this connection, although according to the present embodiment a configuration was described in which photometry can be performed with respect to an arbitrary point on a Fresnel screen by varying the angle of the third mirror 5, a mirror for which the angle is varied is not limited to the third mirror 5. For example, the apparatus can also be configured such that the angle of any member of the group consisting of the first mirror 3, the second mirror 4, and the fourth mirror 6 is varied, or the angles of a combination of two or more of the mirrors in the group consisting of the mirrors 3 to 6 are varied. Alternatively, the angle of the reflection type display device 1 or the color synthesizing prism 2 may be mechanically moved.

Second Embodiment

In the configuration according to the first embodiment, as shown in FIG. 1 the photometric sensor 81 is shaped in a point shape. It is therefore possible to measure color characteristics and luminance for a plurality of points on a display screen by oscillating a projection mirror such as the third mirror 5 using the actuator 91.

However, the configuration need not necessarily be one that uses a point-shaped sensor as the photometric sensor 81. For example, although not illustrated in the drawings, a so-called "line sensor" in which a plurality of measuring devices are arranged in a line may be used. When using a line sensor, the actuator 91 need perform an oscillating operation in only a one-dimensional direction to enable measurement of an arbitrary point on the surface. Thus, according to the configuration of the present embodiment it is possible to perform photometry at an arbitrary point on a Fresnel screen using the actuator 91 that has a simple configuration.

Third Embodiment

In the first and second embodiments, photometry with respect to an arbitrary point on a Fresnel screen is made possible by varying the angle of any mirror or the like using the actuator 91. According to the present embodiment, a configuration is described that enables photometry at an arbitrary point on a Fresnel screen unaccompanied by a mechanical operation of a component of the rear projection apparatus.

Figure 9:
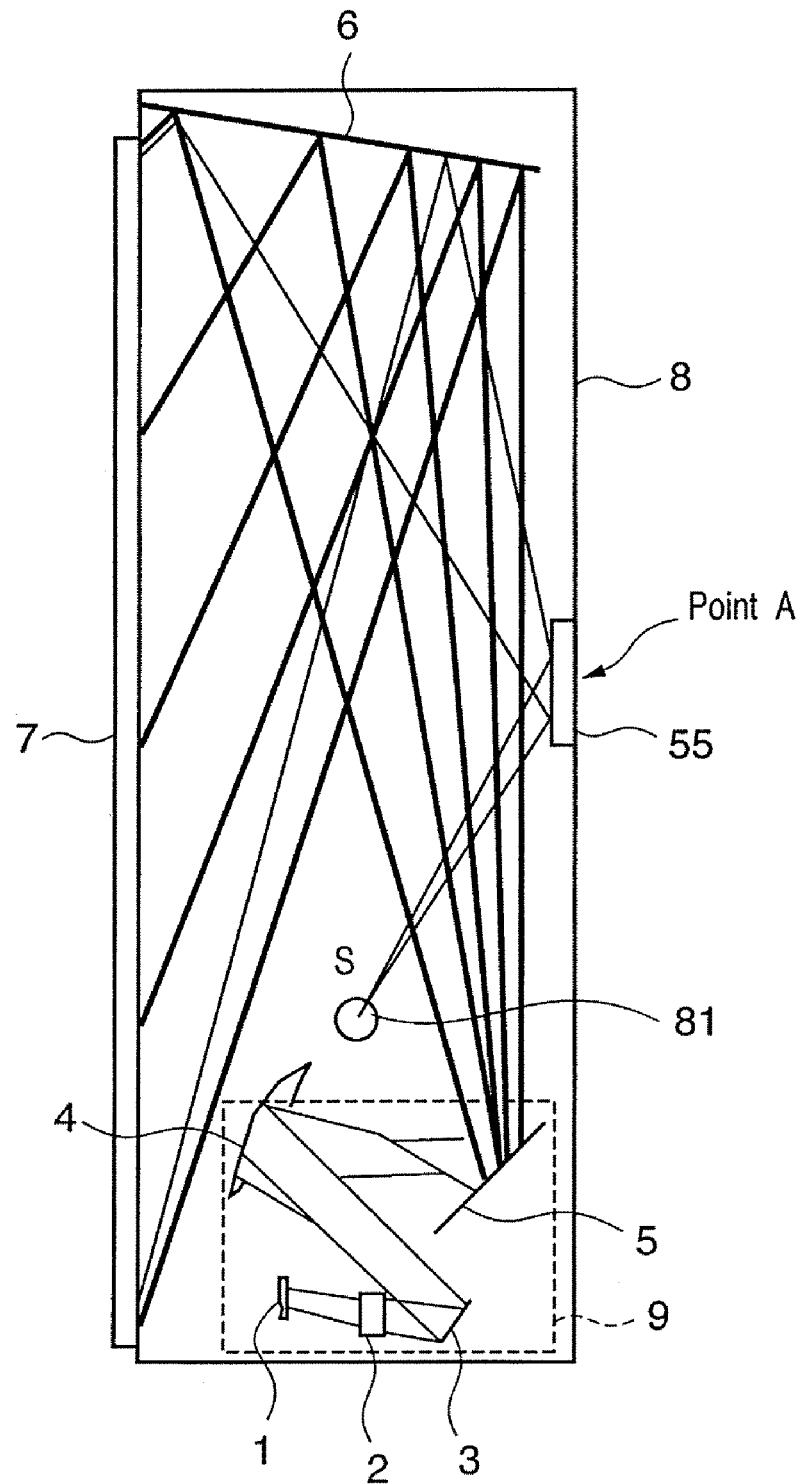
FIG. 9 is a schematic diagram that illustrates the structure of a rear projection type display apparatus.
Figure 10:
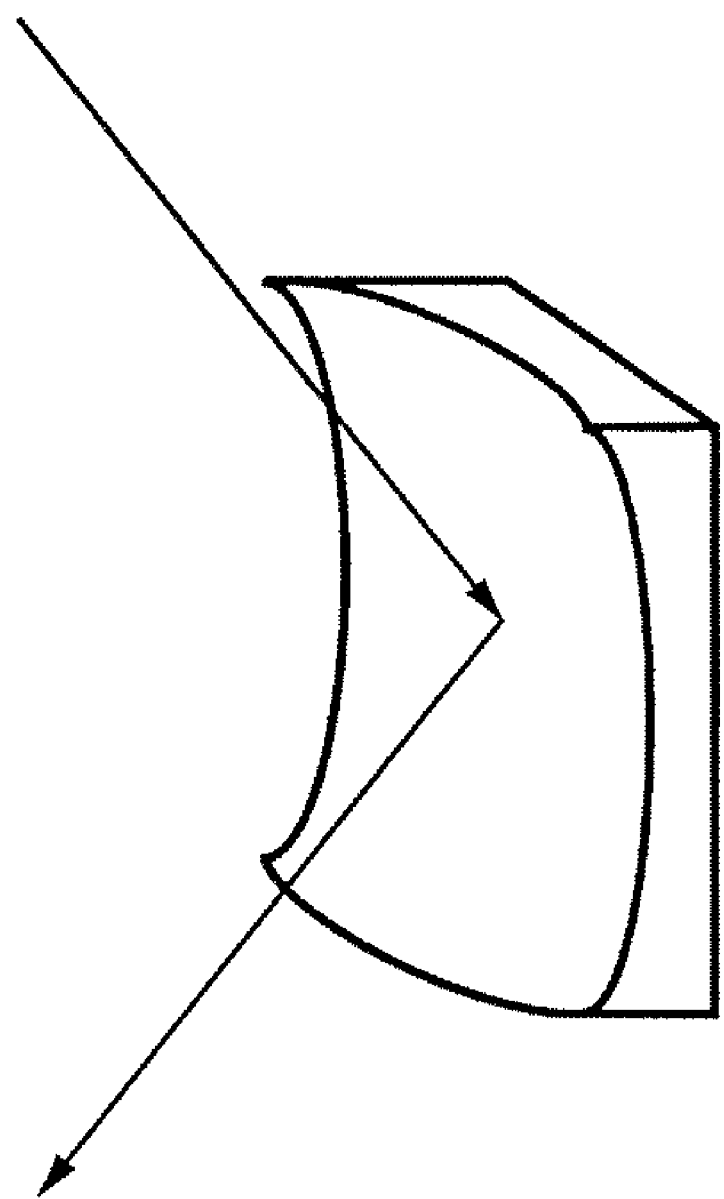
FIG. 10 is a schematic diagram that illustrates the shape of a mirror.

FIG. 9 is a schematic diagram that illustrates the structure of a rear projection type display apparatus according to the third embodiment, and shows a cross section of the body of the rear projection apparatus when viewed from the side. Similarly to FIG. 1, reflected light from the Fresnel screen 71 is irradiated on the surface at point A on the rear surface. However, in the configuration according to the present embodiment a mirror 55 as shown in FIG. 10 is provided at point A. As illustrated in FIG. 10, the mirror 55 has an aspheric surface or a free-form surface. As shown in FIG. 10, since the mirror 55 has a reflective shape, by disposing the photometric sensor 81 at a point S it is possible to focus light on the photometric sensor 81 for the entire region of the image region of point A.

At the time of measurement, using a signal generator, the entire region is taken as a black image and measurement is performed for a specific shape in the region of a measuring point by generating signals for the three primary colors in sequence or a white signal. It is thereby possible to measure the entire image region of point A without operating a mirror. Accordingly, by providing a mirror of a sufficient size at point A, photometry can be conducted for an arbitrary point on the Fresnel screen unaccompanied by the mechanical operation of a component of the rear projection apparatus.

Fourth Embodiment

In the first to third embodiments, configurations were described in which photometry was carried out using reflected light from a Fresnel screen. According to the present embodiment a configuration is described in which light that is projected onto the screen 7 is directly reflected by a mirror, and photometry is performed based on that light.

Figure 11:
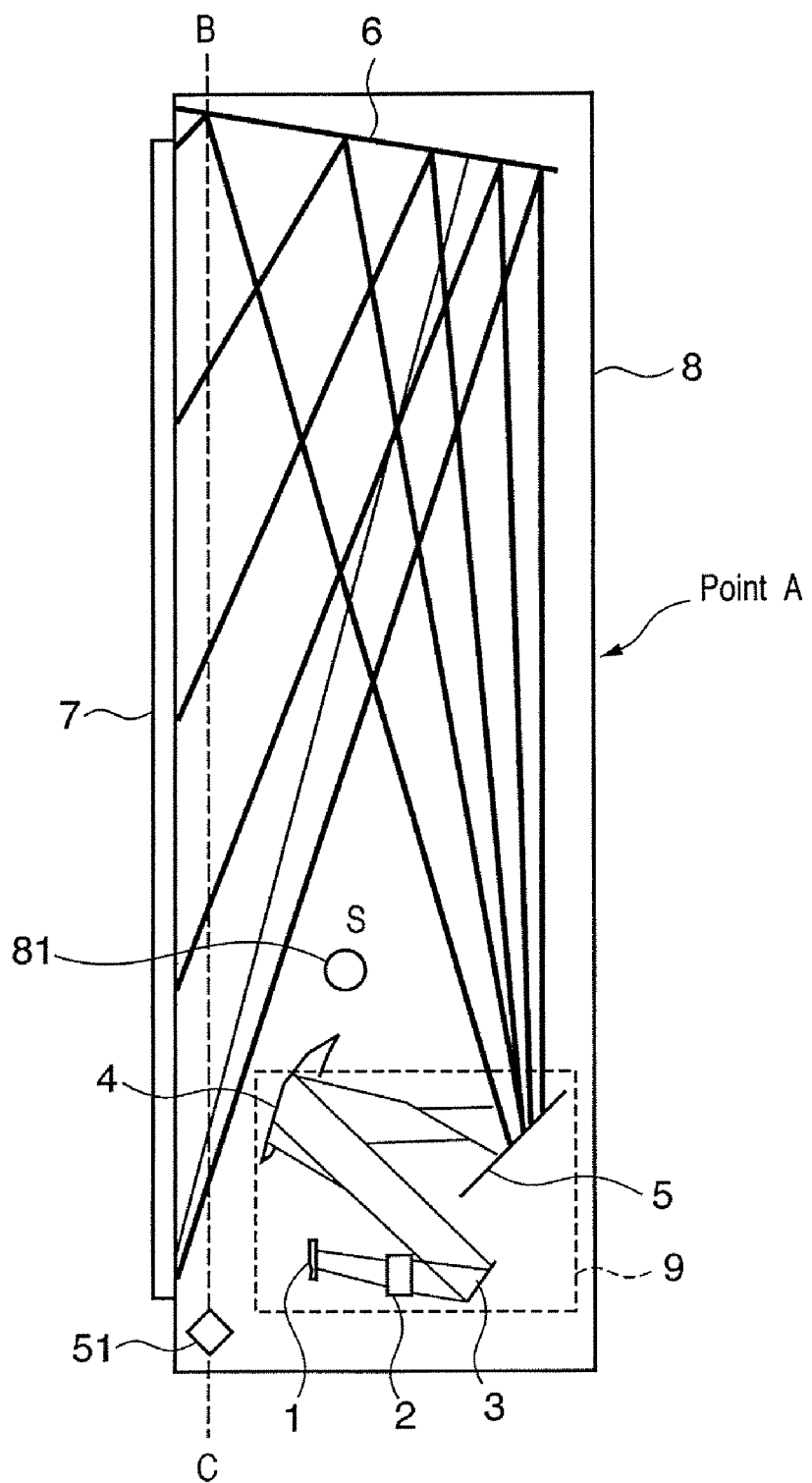
FIG. 11 is a schematic diagram that illustrates the structure of a rear projection type display apparatus.

FIG. 11 is a structural drawing based on a cross section of a rear projection apparatus according to the fourth embodiment. The body 8 comprises therein the projection unit 9, the reflection mirror 6, and the screen unit 7 that were described in the first embodiment. However, unlike the first embodiment, the mirror 5 is configured in a fixed state. Further, unlike the first embodiment a minute mirror (hereunder, referred to as "measuring mirror") 51 is provided on the inner side of the screen 7.

Figure 12:
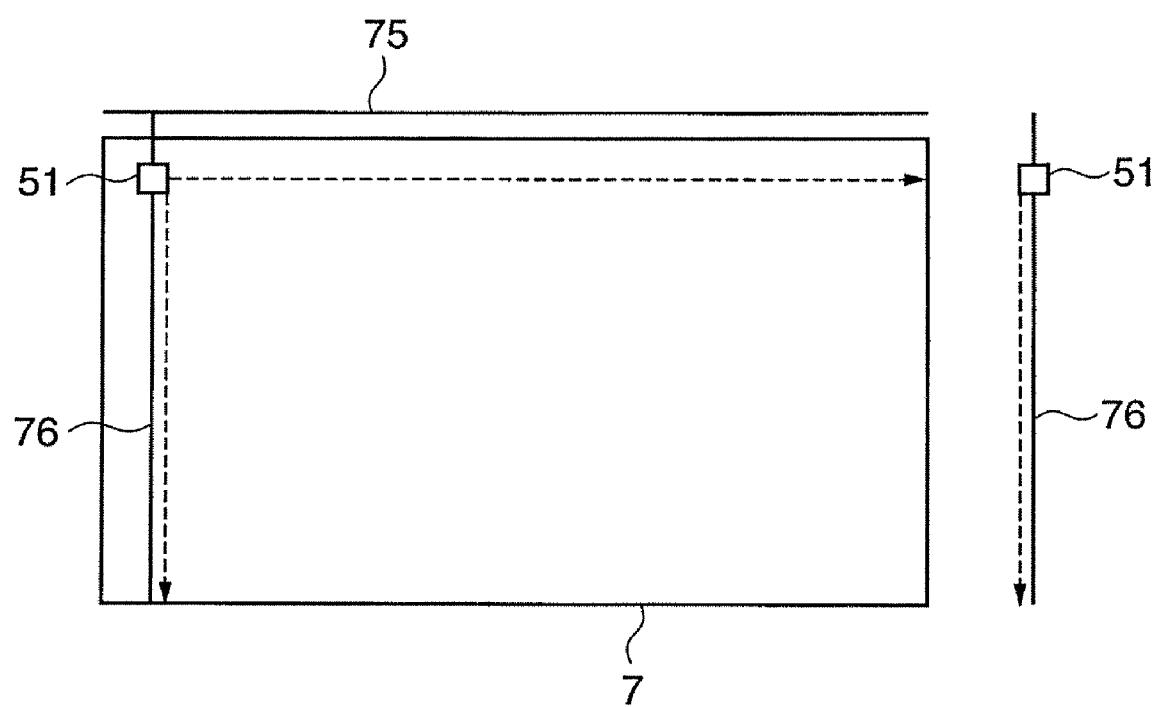
FIG. 12 is a view showing the state of a rear projection type display apparatus when viewed from the inner side of the screen.

FIG. 12 is a view showing the state of the rear projection type display apparatus when viewed from the inner side of the screen 7. The horizontal position of the above described measuring mirror 51 can be changed using a horizontal carriage 75 that is movable in the horizontal direction. The horizontal carriage 75 can also be moved in the vertical direction using a vertical carriage 76 that is movable in the vertical direction. The measuring mirror 51 reflects a light flux from a projection unit on a pedestal 754 toward the photometric point sensor 81 that is attached at the position shown in FIG. 11.

Figure 13:
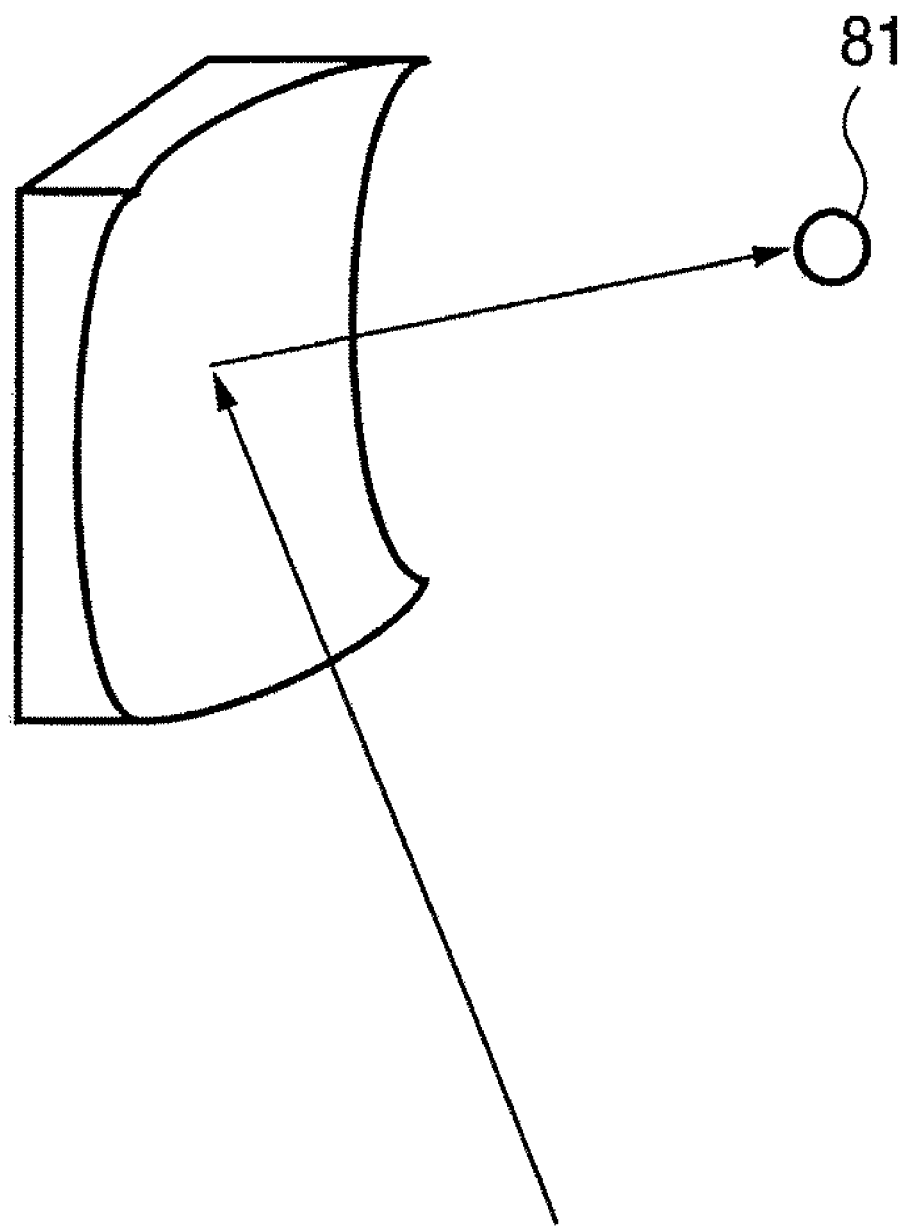
FIG. 13 is a schematic diagram that illustrates the shape of a mirror.

FIG. 13 is a schematic diagram that shows the shape of the measuring mirror 51. As shown in FIG. 13, the measuring mirror 51 is a flat concave mirror that can focus projection light for the entire moving range on the photometric sensor. As described above, the horizontal carriage 75 and the vertical carriage 76 as moving units are, for example, as shown in FIG. 14A, driven for scanning by a motor 91 through a timing belt 753 that is extended on a rail element 751. In FIG. 14A, reference numeral 752 denotes a pulley gear and reference numeral 754 denotes the pedestal of the mirror, and the motor 91 is mechanically engaged with the pulley gear 752 for rotation.

Figure 14B:
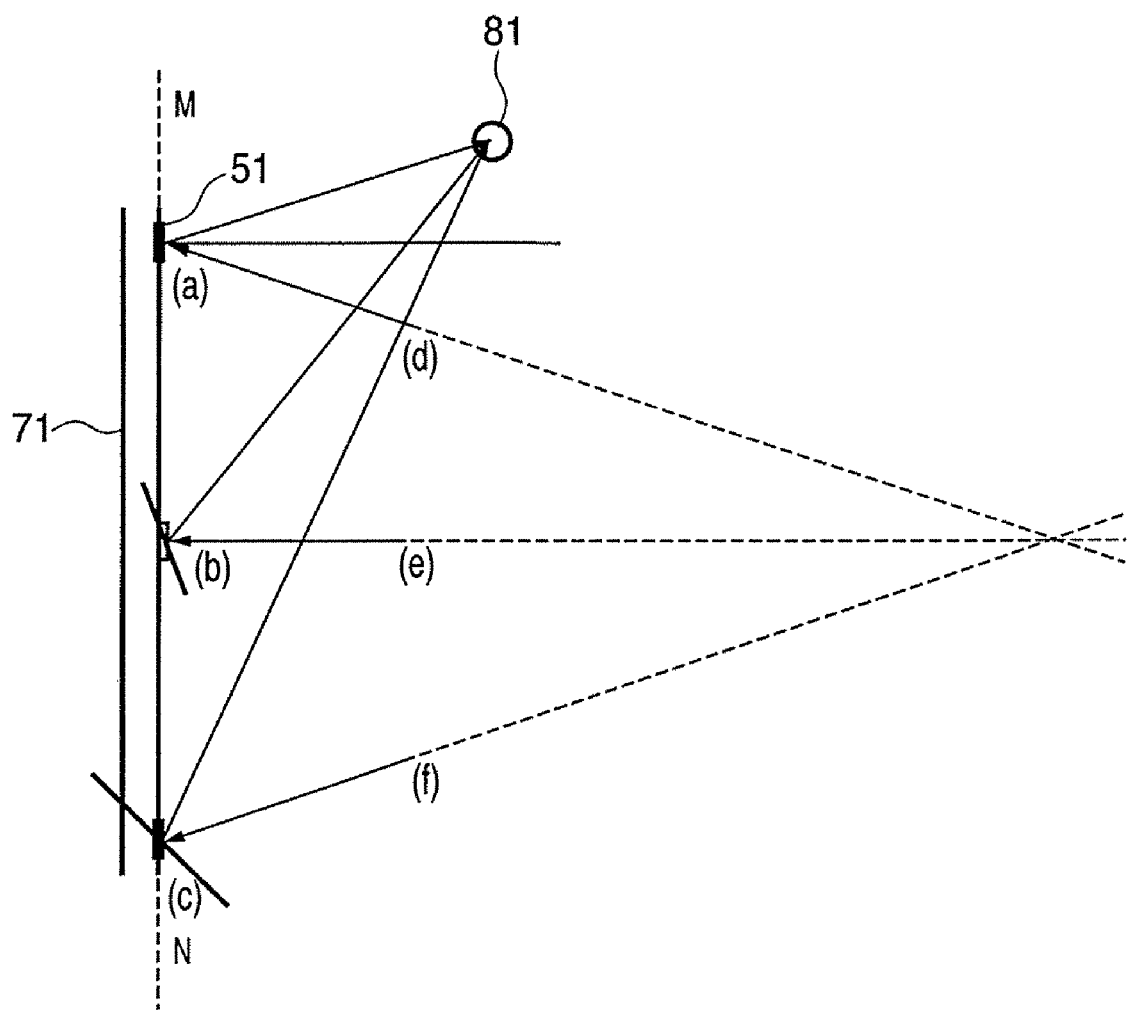
FIG. 14B is a top view of the rear projection type display apparatus.

FIG. 14B is a top view of the rear projection type display apparatus according to the present embodiment. FIG. 14B illustrates an example of the measuring points of the photometric sensor 81 and the mirror 51. The horizontal carriage 75 is disposed on a straight line MN along the inside of the screen 71, and the mirror 51 scans along points (a), (b), and (c). Naturally, in practice the aforementioned vertical carriage 76 is mounted between the horizontal carriage 75 and the mirror 51 in the figure and scans in the manner illustrated in FIG. 12.

Figure 15:
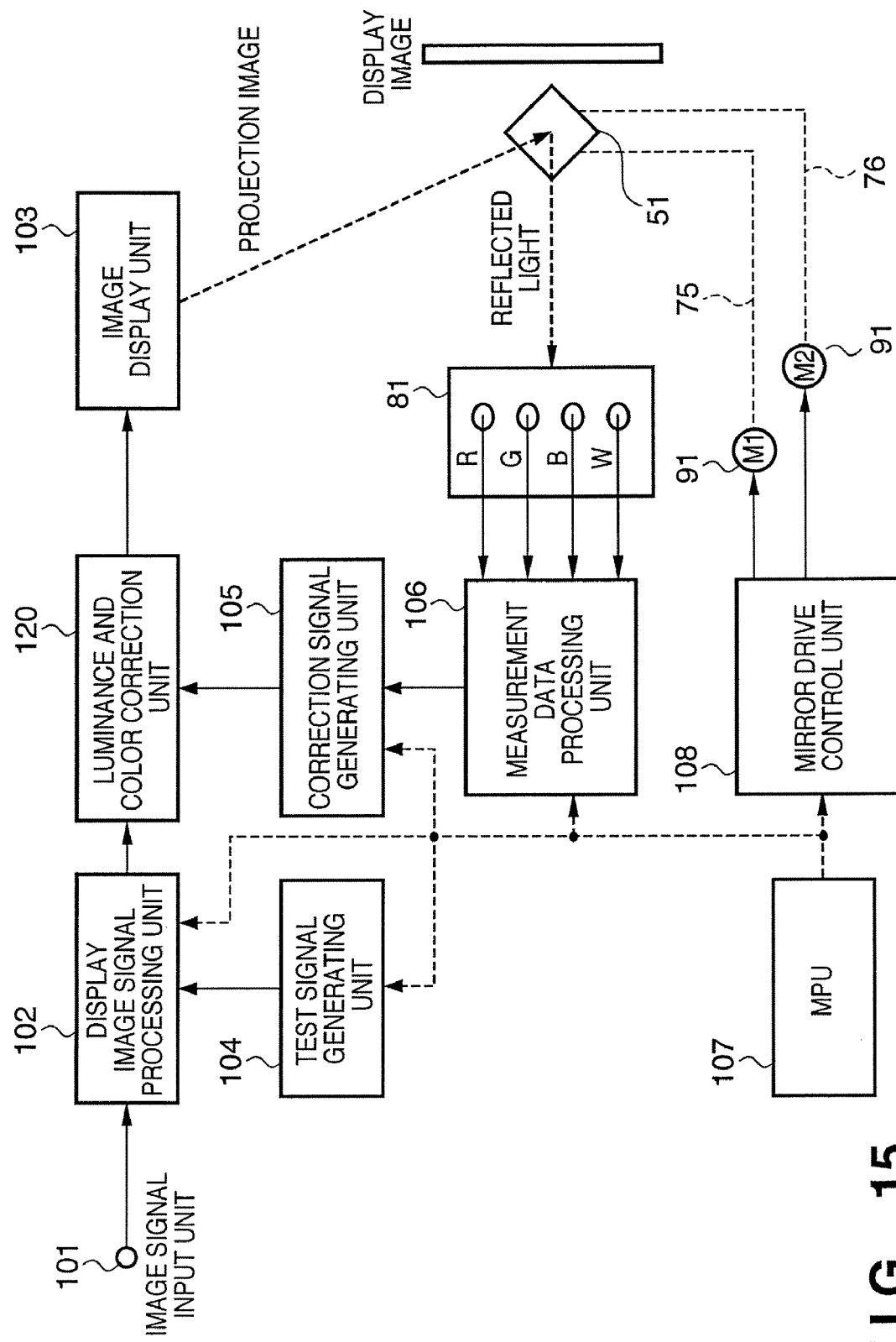
FIG. 15 is a circuit block diagram that relates to correction of display characteristics.

FIG. 15 is a circuit block diagram that relates to correction of display characteristics in the present embodiment. In FIG. 15, reference numeral 101 denotes an image signal input unit into which image signals for display are input. Reference numeral 102 denotes a display image signal processing unit, and reference numeral 120 denotes a luminance and color correction unit. Reference numeral 103 denotes an image display unit. Reference numeral 104 denotes a test signal generating unit. Reference numeral 105 denotes a correction signal generating unit. Reference numeral 106 denotes a measuring unit and measurement data processing unit. Reference numeral 107 denotes a microcontroller (hereunder, referred to as "MPU") unit. Reference numeral 108 denotes a mirror drive control unit. Reference numeral 51 denotes a minute mirror. Reference numeral 81 denotes the aforementioned photometric sensor. Reference numeral 91 denotes an actuator.

Normally, an image signal that corresponds to an image to be displayed is input into the image signal input unit 101, and the display image signal processing unit 102 and the luminance and color correction unit 120 drive the image display unit 103 to perform image display. As described above using FIG. 1, an image is projected onto the screen unit 7 by the projection optical system to display the image.

By driving in a measurement mode, control is performed according to predetermined procedures at the MPU 107 to output drive signals from the mirror drive control unit 108, and drive the actuator 91 to move and scan the minute mirror 51 in a two-dimensional direction. Further, test signals are generated by the test signal generating unit 104 in synchrony with that moving and scanning. The minute mirror 51 is scanned so as to sequentially pass through each of the points a, b, c, d, e, f, g, h, and i on the screen. At this time, because of a focus effect of the concave surface of the mirror, no matter which position the scan object is in, light can be reflected and focused at the photometric sensor 81.

Thus, according to the configuration of the present embodiment, measurement by the photometric sensor 81 is possible at the points a, b, c, d, e, f, g, h, and i shown in FIG. 7. The sensor output from the photometric sensor 81 is input in sequence to the measurement data processing unit 106. The measurement data processing unit 106 performs appropriate data processing based on the input sensor output. The correction signal generating unit 105 generates a correction signal based on the data that underwent data processing at the measurement data processing unit 106, and supplies the correction signal to the luminance and color correction unit 120. The luminance and color correction unit 120 corrects white balance and inconsistencies in the color tones and luminance and the like of the display image to correct the image from the image display unit 103. Thus, according to the configuration of the present embodiment, the luminance, colors, and tones of a display image to be displayed on the screen 7 can be suitably corrected.

In this connection, although according to the present embodiment the minute mirror 51 was described as a curved mirror having a concave focusing effect, the present embodiment is not limited thereto. For example, the minute mirror 51 may be configured as a flat mirror, and the angle of reflection of the mirror along the respective points a, b, c, d, e, f, g, h, and i of the screen may be controlled by the actuator 91. Naturally, measurement by the photometric sensor 81 of a fixed point is also enabled in this configuration. In this case, a configuration can be adopted in which the mirror angle is controlled in synchronization with the mirror position by a control signal from the MCU (microcontroller) 107. In this case, the relation between a mirror position and an angle is previously stored as a data and a program in the MCU or an adjacently connected memory, and control is carried out.

As described above, according to the configuration of the present embodiment, a light to be projected onto a screen 7 is directly reflected by a mirror, and based on this light, photometry and processing that corrects the colors and the like of the image are performed. Therefore, according to the configuration of the present embodiment it is possible to perform suitable correction for image display characteristics based on accurate light information.

Fifth Embodiment

According to the first to fourth embodiments, projection light or reflected light of a Fresnel lens was guided to an optical sensor using a mirror or the like, and the light was detected. According to the present embodiment a configuration is described in which a plurality of minute optical sensors that do not affect image quality are disposed on the inside of the screen 7, and photometry is performed using the optical sensors.

Figure 16A:
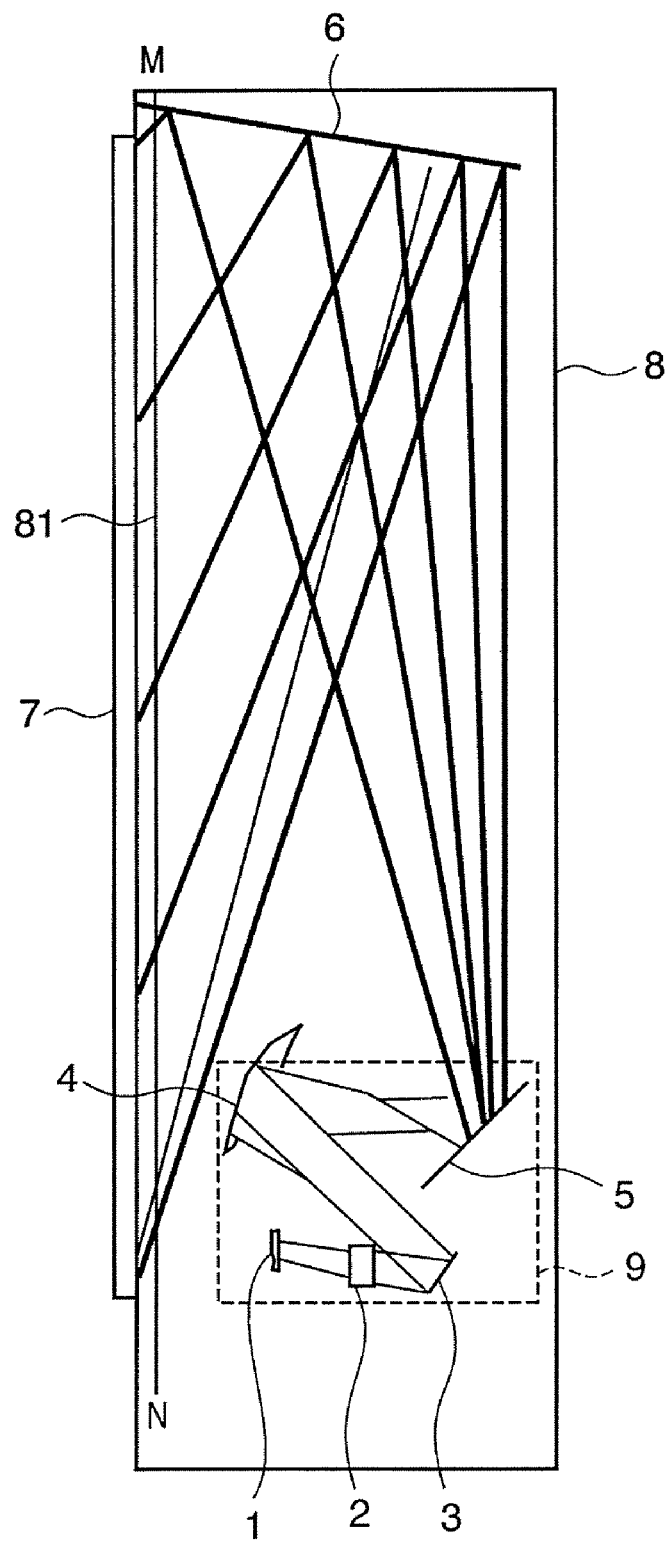
FIG. 16A is a schematic diagram that illustrates the structure of a rear projection type display apparatus.

FIGS. 16A and 16B are structural drawings of the rear projection apparatus according to the fifth embodiment. FIG. 16A is a lateral cross section, and FIG. 16B is a perspective view from the top surface. The rear projection apparatus according to the present embodiment comprises a body 8, a screen 7, a projection unit 9, and a photometric sensor unit 81 that is disposed on the inside of the screen 7. Although the projection configuration is the same as the configuration according to the first embodiment, in the present embodiment each mirror is fixed. In this connection, the photometric sensor unit 81 is disposed between the straight line M-N shown in FIG. 16A.

Figure 17:
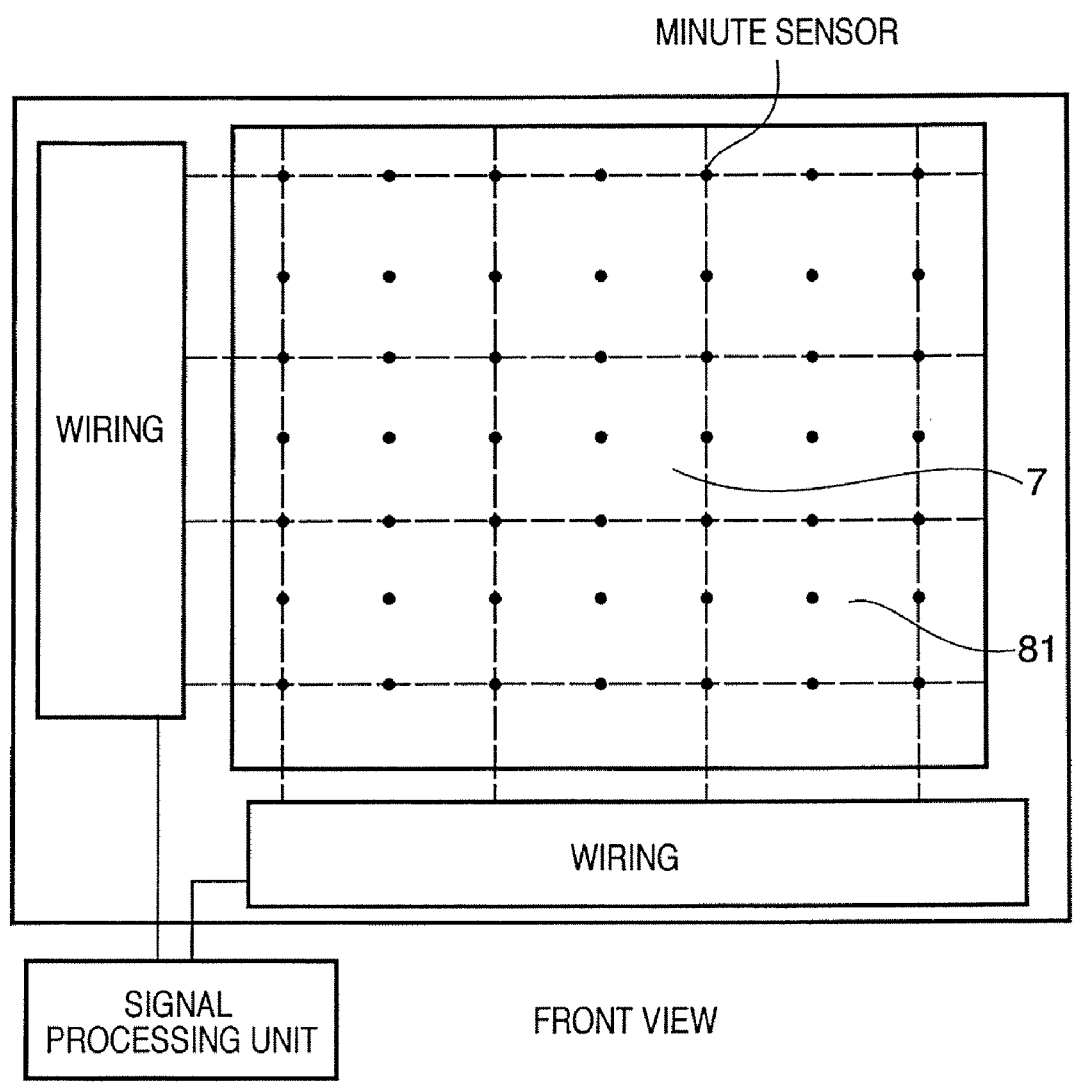
FIG. 17 is a view of a sensor unit when a screen side is viewed from the inner side of the rear projection display apparatus.
Figure 18:
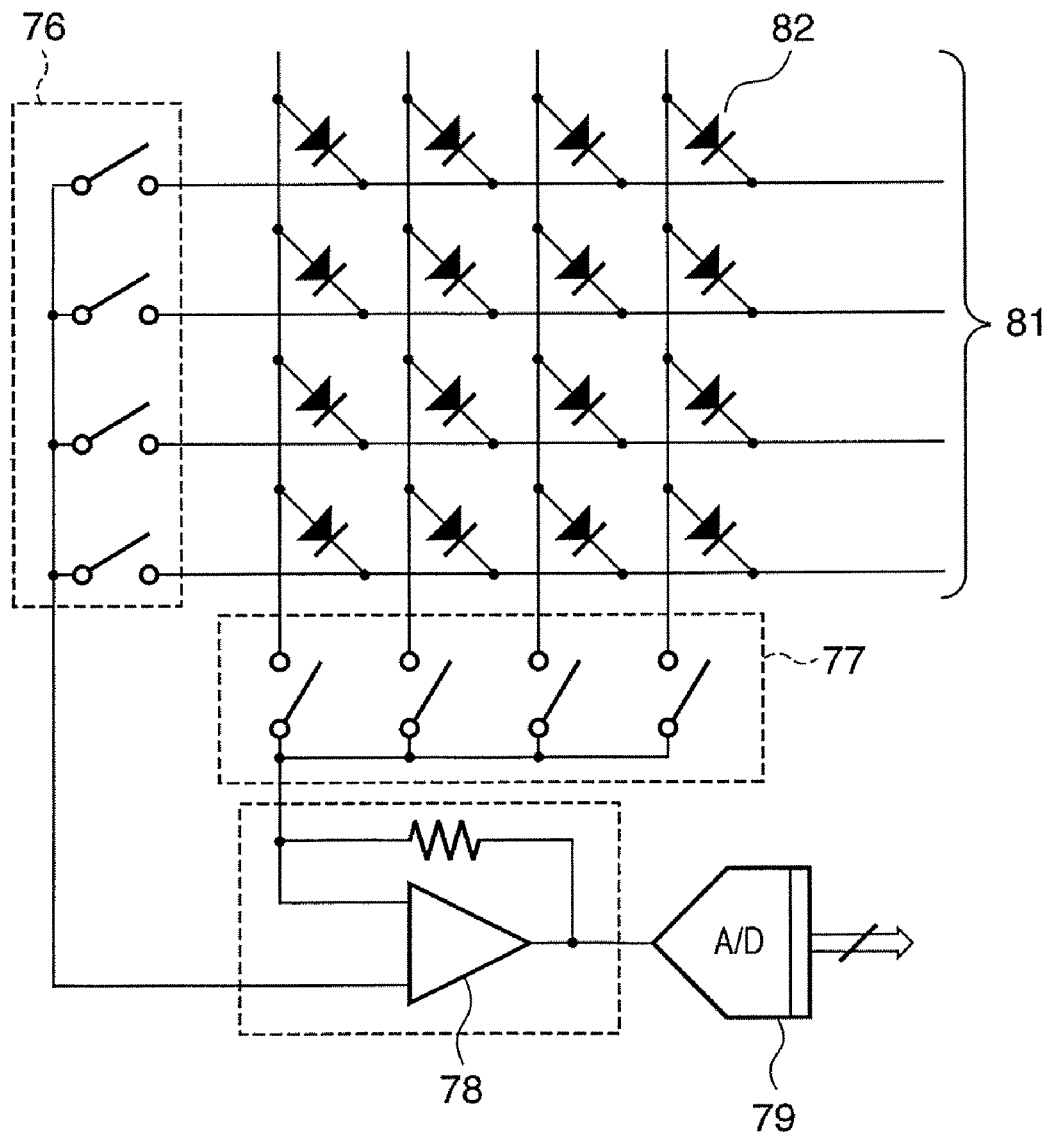
FIG. 18 is a view that shows the connection of sensor units using circuit symbols.

FIG. 17 is a view of a sensor unit 81 when the screen 7 side is viewed from the inside of the rear projection display apparatus. As shown in FIG. 17, the sensor unit 81 comprises wirings disposed in a grid shape and minute photometric sensors that are attached at each intersection point of the wirings. Each of the grid-shape wirings is led to outside the screen area and connected to a signal processing unit that has a switching circuit. FIG. 18 is a view showing the connection of the photometric sensor unit 81 with circuit symbols.

As shown in FIGS. 17 and 18, a plurality of minute photometric sensors 82 are disposed in a grid shape in the photometric sensor unit 81, the minute photometric sensors 82 are connected by minute wires, and are respectively led to the periphery of the screen. The minute photometric sensors 82 can be configured using, for example, photodiodes.

Figure 19:
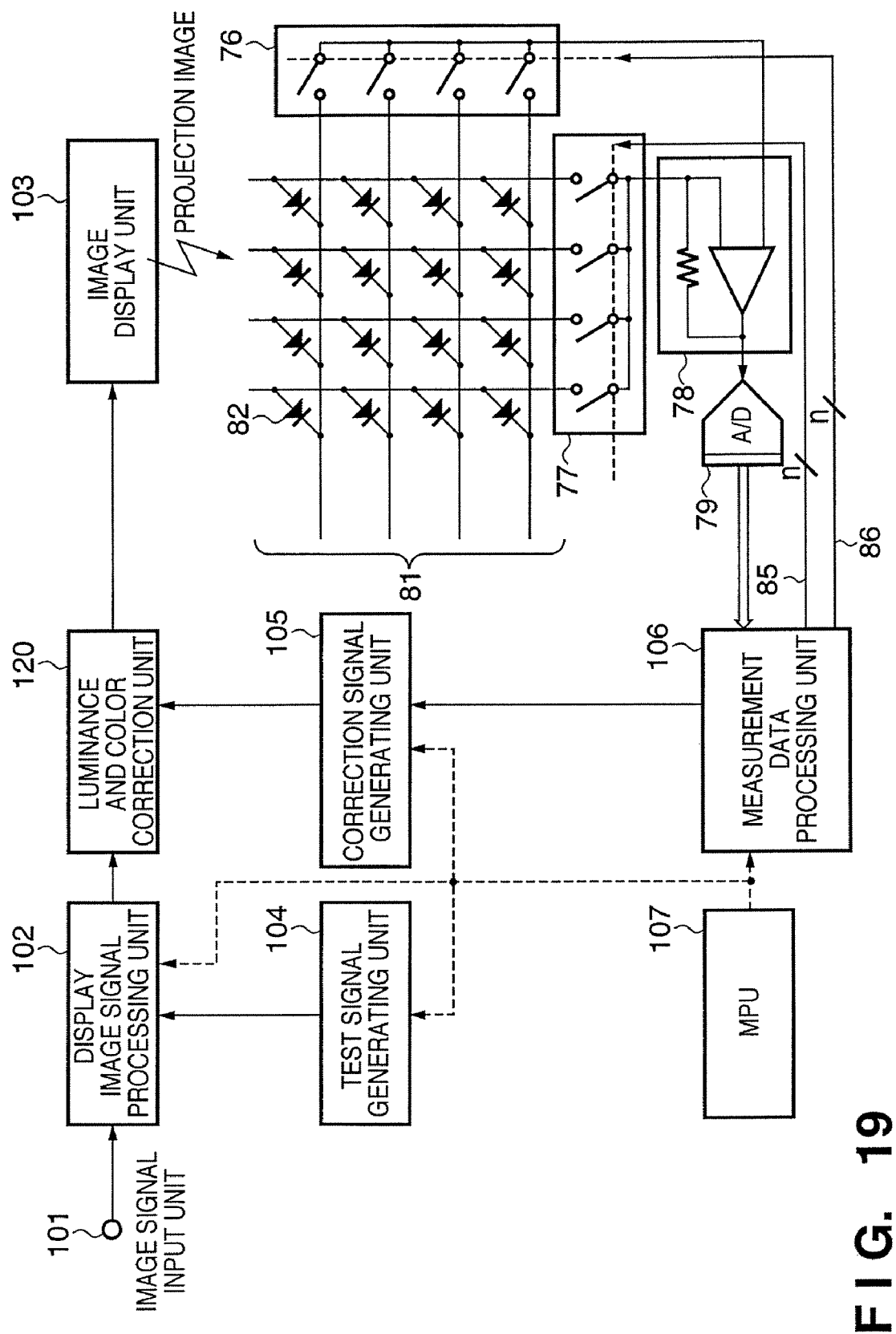
FIG. 19 is a circuit block diagram that shows a circuit configuration.

Hereunder, measurement and correction operations are described referring to FIG. 19. FIG. 19 is a circuit block diagram showing the circuit configuration according to the present embodiment. As shown in FIG. 19 that illustrates the circuit block, by changing switches at switching circuits 76 and 77 in the photometric sensor unit 81, a desired minute sensor 82 can be selected to perform photometry.

A terminal that is lead as described above, is changed over at changeover switch units with switch address coders 76 and 77 by a digital changeover control signal from the measurement data processing unit 106, such that one photometric sensor 82 is definitely selected. The selected photometric sensor 82 is connected to a current-voltage conversion unit 78 and digitized by a subsequent AD converter 79. The digitized photometric value is subjected to correction of temperature characteristics and correction of the characteristics between each sensor at the subsequent measurement data processing unit 106 and processed as a normalized photometric data value. The normalized photometric value is input into the subsequent correction signal generating unit 105. Based on the data between each sensor, the correction signal generating unit 105 generates correction data for the entire screen area, for example, by interpolation processing in the horizontal and vertical directions and the tone direction, and supplies the direction to the luminance and color correction unit 120. The luminance and color correction unit 120 performs correction based on the input correction data.

In an actual measurement, although not illustrated in the drawings, for example, in response to an operation performed at the console of the display apparatus, the MCU (microcontroller) 107 executes control so as to enter a calibration mode. It is then possible to display test images for each of the colors red green and blue as well as black and white images on the image display unit 103 according to a test signal from the test signal generating unit 104 to perform measurement. In this case, at the display image signal processing unit 102, a test signal from the test signal generating unit 104 is selected to perform the above described measurement and correction value setting. Subsequently, when displaying an input image signal, the above described measurement and correction value setting is ended and, although not illustrated in the drawings, an input image signal from the image input terminal 101 is selected at the display image signal processing unit 102 and displayed. Further, a correction signal derived according to a test signal from the test signal generating unit 104 is stored in a memory (not shown) at the correction signal generating unit 105 such that the correction of the display image is maintained until at least the next calibration. Further, if a nonvolatile memory is used as the memory, even at a stage when the power of the apparatus is turned on again after being turned off, the correction values are maintained and can be used for correction. Further, when the memory of the MCU 107 and not that of the correction signal generating unit 105 is used as the above described nonvolatile memory, by processing of the MCU, the same correction can be performed even when data is supplied to the memory of the correction signal generating unit 105.

As described above, in the configuration according to the present embodiment a plurality of photometric sensors 82 are disposed across the range of a screen display area at a distance that does not form an image on the screen directly, on the inner side of the screen of the rear projection type display apparatus. Using these photometric sensors 82, photometry is performed for each color and for black at each point. These measurement values are normalized at the data processing unit 106 and used for generating a correction signal at the correction signal generating unit 105. The luminance and color correction unit 120 executes correction of the display characteristics based on the correction signal.

Thus, according to the configuration of the present embodiment, it is possible for an optical sensor to directly detect a projection light without guiding light to the optical sensor using a mirror or the like.

In this connection, with respect to the test signals from the test signal generating unit 104, naturally it is also possible for intermediate level signals that represent the tone of each signal to be respectively displayed to generate correction data and perform correction. Further, according to the present embodiment, by disposing the photometric sensors 82 in an aligned manner at each of the points that divide the screen in a grid shape and displaying a test signal for each color, the display characteristics can be measured for each color. However, with respect to the photometric sensors 82, respective photometric sensors equipped with spectral sensitivity for, for example, red (R), blue (B), and green (G) may be disposed at each of the points that divide the screen in a grid shape, and separate wiring provided. In this case, at the aforementioned changeover switch units with switch address coders 76 and 77, suitable changeover and sequential measurement is performed in accordance with digital changeover control signals from the measurement data processing unit 106. A test chart for measurement of the test signal generating unit 104 can thus be made simpler and flexible, to enable faster measurement times and increased result accuracy. Further, a configuration may also be adopted in which sensors are equipped with spectral sensitivity for, for example, red (R), blue (B), and green (G), and the photometric sensors are aligned in order at equal intervals to perform photometry.

Sixth Embodiment

In the above described embodiments, it was necessary to project a dedicated test signal to perform correction related to image display characteristics. According to the present embodiment a configuration is described that enables correction relating to image display characteristics in usage relating to a normal image display, without displaying and outputting a dedicated test signal.

Figure 20:
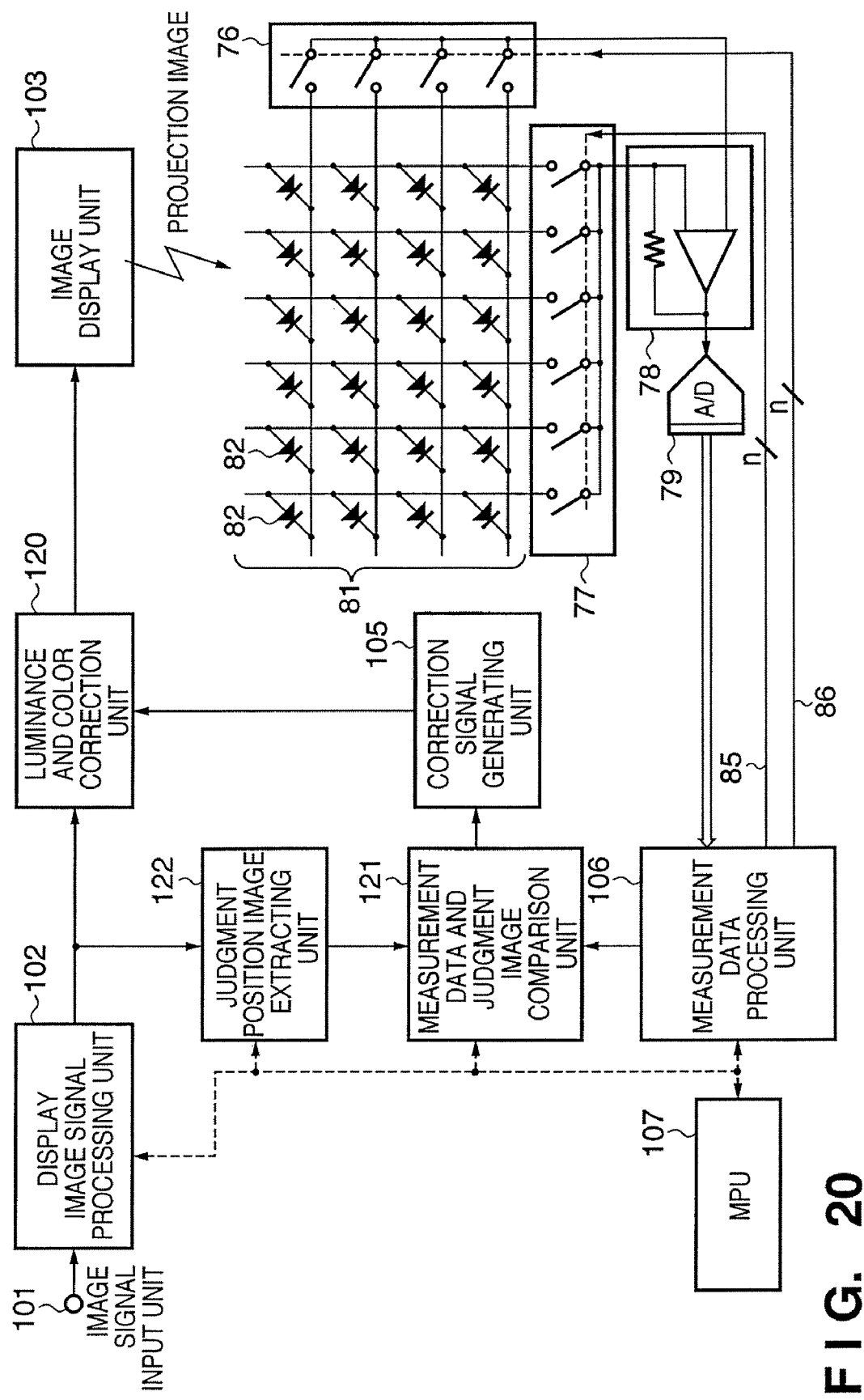
FIG. 20 is a circuit block diagram that shows a circuit configuration.

FIG. 20 is a circuit block diagram showing the circuit configuration according to the present embodiment. In the configuration according to the present embodiment, similarly to the configuration according to the fifth embodiment, the inner side of the screen 7 of the rear projection display apparatus shown in FIG. 16 comprises the following components:
 a plurality of photometric sensors 82 aligned in a grid, and wiring;
 changeover switch units with switch address coders 76 and 77;
 a current-voltage conversion unit 78; and
 an AD converter 79.

In this connection, similarly to the configuration according to the fifth embodiment, the photometric sensors 82 are equipped with spectral sensitivity for, for example, red (R), blue (B), and green (G), and measurement is also possible when respective photometric sensors are provided for each color. However, for convenience, the following description is given based on the premise that sensor units 81 of the same configuration are equipped with spectral sensitivity for the three colors.

According to the configuration of the present embodiment, a new measurement technique that is different to the configuration according to the fifth embodiment is realized by the circuit configuration shown in FIG. 20. In FIG. 20, an audio-visual display image signal is input into the image signal input unit 101. To facilitate the description, the image of the input image signal will be described with reference to FIGS. 21A to 21D. FIGS. 21A to 21D are schematic diagrams of image signals that show the relation between an image judgment and a measurement area.

Figure 21A:
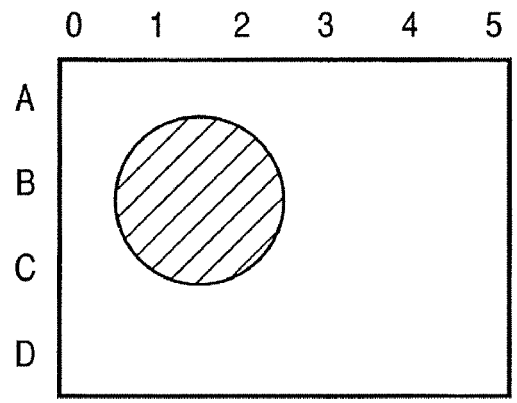
FIG. 21A is a schematic diagram of image signals that show the relation between an image judgment and a measurement area.
Figure 21B:
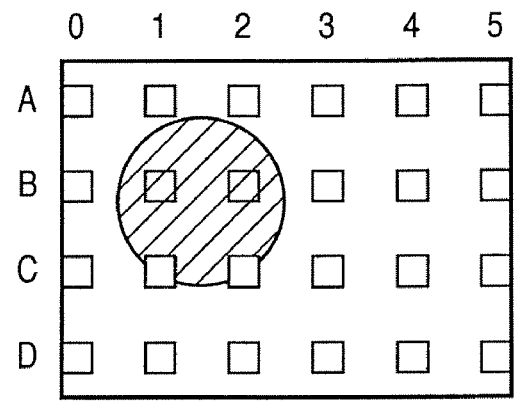
FIG. 21B is a schematic diagram of image signals that show the relation between an image judgment and a measurement area.

As shown in FIG. 21A, according to the present embodiment it is assumed that an audio-visual image is a chart having a yellow circle at a slightly left upper position on the screen. FIG. 21B is a view showing 24 square frames disposed in a grid shape on the chart shown in FIG. 21A. These 24 square frames represent the positions of the photometric sensors 82 for measurement, and indicate 24 measurable points from A0 to D5, as well as the measurement range at each point. These 24 square frames are denoted by marks that are drawn to facilitate the description, and they do not actually exist as image signals sent to the display apparatus.

Next, an image signal that is input into the image signal input unit 101 is input to the image display unit 103 via the display image signal processing unit 102 and the luminance and color correction unit 120 and displayed as an image. In the present embodiment, similarly to the configurations of the above described embodiments, using the three reflection type liquid crystal display devices 1 as shown in FIG. 2, a color image is displayed and projected to display an image corresponding to an image signal on the screen 7. An image light to be displayed on the screen 7 is subjected to photometry by a plurality of photometric sensors 82 that do not form an image on the screen 7 or are provided in positions in which recognition as images is difficult. More specifically, as described with reference to FIG. 21B, photometry is performed at the 24 measurable points from A0 to D5.

According to the configuration of the present embodiment, similarly to the fifth embodiment, based on measurement address specification data from the measurement data processing unit 106, a photometric sensor 82 to perform photometry is selected by switching the switch circuits 76 and 77 and photometry is conducted. Detection light is detected as a current value in the photometric sensor 82, and is supplied via the current-voltage conversion circuit 78 to the subsequent AD converter 79 to be digitized (quantized). The quantized digital data is then input to the measurement data processing unit 106.

In this manner, photometric data for the display image at the 24 measurable points from A0 to D5 is input based on a photometric sensor selection signal from the measurement data processing unit 106. Meanwhile, the aforementioned image signal of the image chart (FIG. 21A) that is input into the image signal input unit 101 is input to a judgment position image extracting unit 122 as signal components of red (R), green (G) and blue (B) from the display image signal processing unit 102. At the judgment position image extracting unit 122, based on the input image signals for red (R), green (G) and blue (B), a judgment is made as to whether or not photometry can be performed at each of the 24 measurable points from A0 to D5. That is, it is judged whether or not data for use in correction relating to the image information can be measured. More specifically, it is determined whether or not each position of the measurable points is in a condition in which photometry is enabled, based on whether or not the luminance information and color information of an image signal changes in the horizontal and vertical directions inside the range of the measurable region of each sensor 82. Whether or not the luminance information and color information of an image signal changes in the horizontal and vertical directions refers to, more specifically, whether or not the luminance information and color information is uniform. If the luminance information and color information is uniform, it is judged that the information is suitable as data for use in correction relating to image information, and if the information is not uniform it is judged that the information is unsuitable. As a specific example, a case is assumed in which input image signals at the aforementioned display image signal processing unit 102 are signal components of red (R), green (G), and blue (B). In this case, if there is a change in a signal value at respective timings in the horizontal and vertical directions corresponding to the above described sensor positions of each signal, it can be judged that the information is not uniform, and if there is no change it can be judged that the information is uniform.

Figure 21C:
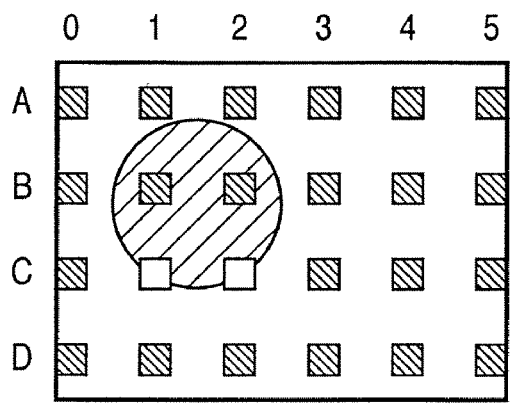
FIG. 21C is a schematic diagram of image signals that show the relation between an image judgment and a measurement area.

For example, we will suppose a case in which the measurement area of a single photometric sensor 82 is a position and an area as represented by the 24 square areas from A0 to D5 as shown in FIG. 21B. In this case, for the input circle that is displayed at a slightly left upper position on the screen shown in FIG. 21A, the sensors which are capable of measurement are judged to be the sensors with respect to the circular arc is not included within the area of the relevant sensor. For example, when a circle and sensors are disposed as shown in FIG. 21B, the sensors which are capable of measurement are judged to be the points other than 1C and 2C as shown in FIG. 21C in which the image does not change within the quadrangular region, which are indicated by black lines in the FIG. 21C. Accordingly, the measurement data relating to the measurement points 0A to 5A, 0B to 5B, 0C, 3C to 5C, and 0D to 5D is taken to be valid.

In this connection, a signal variation in the horizontal direction is detectable by detecting a difference with respect to image data for the preceding one clock in image sampling units. Further, a signal variation in the vertical direction is detectable by detecting a difference between the current image data value and the image data value of the previous one line using a one line memory. For example, a threshold value is appropriately set to take into account detection errors, and a detection value equal to or greater than the specified value is acquired as a variation detection signal. Using this variation detection signal, the judgment position image extracting unit 122 operates to supply image signal data for red (R), green (G), and blue (B) of valid points to a subsequent measurement data and judgment image comparison unit 121. Further, address data corresponding to the valid points (photometric sensor positions) at the judgment position image extracting unit 122 is output at the same time.

The measurement data and judgment image comparison unit 121 compares display data corresponding to effect sample (measurement) points in the display image from the judgment position image extracting unit 122 and display data that is derived from measurement data from the photometric sensors 82 from the measurement data processing unit 106. However, the display data includes chromaticity data or luminance data of the aforementioned signal components for red (R), green (G), and blue (B). Based on this comparison, for each of the points 0A to 5A, 0B to 5B, 0C, 3C to 5C, and 0D to 5D shown in FIG. 21C comparison data is derived in sequence by arithmetic processing or circuit processing. This comparison data is then supplied to the correction signal generating unit 105. In this case, even if the variation detection signal is further supplied to the measurement data and judgment image comparison unit 121 and selection of a comparison operation is performed, a similar comparison signal can be obtained.

The correction signal generating unit 105 obtains the correlation between the aforementioned sample (photometry) points in the correction data, and subjects the sample (photometry) points in the correction data to interpolation correction to generate a correction signal. The correction signal generating unit 105 comprises a correction data memory (not shown) that stores the correction data for performing correction of the screen as described above in at least photometric sensor units. When the measurement data of the photometric sensor 82 is judged as valid, that is, when valid comparison data is output from the measurement data and judgment image comparison unit 121, the correction data of the corresponding addresses of the correction data memory are rewritten in sequence. With respect to these addresses, address data that corresponds to data for valid points (photometric sensor positions) in the judgment position image extracting unit 122 is supplied to the correction signal generating unit 105 and selection of addresses is performed using that data. At the luminance and color correction unit 120, based on the above described correction data, image signals for red (R), green (G), and blue (B) are corrected to correct the display image of the image display unit 103 and perform correction of the tones, luminance and colors of the display apparatus inside the display screen.

As described above, according to the configuration of the present embodiment, for the respective photometric sensors 82, input signal in the measurable range thereof are analyzed. Thereafter, only when it is judged that the image signal that is displayed is uniform, the data obtained by photometry at the photometric sensor 82 is utilized as data that can be used in correction relating to image display characteristics. Therefore, according to the configuration of the present embodiment, it is possible to detect measurable points in an input image signal even in normal usage, without inputting a dedicated test signal and interrupting the image display to be viewed. Accordingly, in normal usage, it is possible to detect data that is effective for correction relating to image display characteristics, compare measurement data at the measuring points with the luminance value and chromaticity value that should be displayed by the input image signal, and execute correction relating to the image display characteristics.

Seventh Embodiment

In usage relating to a normal image display, in many cases the image that is actually input is accompanied by movement, such as when the imaging conditions are changed by a pan, tilt or zoom operation or when the subject moves. According to the present embodiment a configuration is described in which correction relating to image display characteristics is possible in normal usage even when there is movement in the input image.

The input image signal is input into a frame memory. However, when the input image signal is an analog signal the signal is digitally converted and input into the frame memory, and when the input image signal is a digital signal it is input in that state into the frame memory. The frame memory retains data relating to each frame, and each time a frame is updated the frame memory outputs the previously retained frame data to detect a difference at a comparison stage. It is thereby possible to detect inconsistencies in the measurement data due to movement in the image. More specifically, according to the configuration of the present embodiment, for a point at which a light signal does not change between frames, the measurement value of the light signal that is detected by the sensor at that point is used as data for image correction.

Figure 21D:
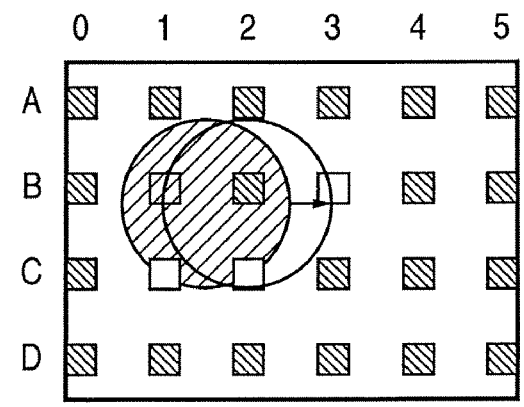
FIG. 21D is a schematic diagram of image signals that show the relation between an image judgment and a measurement area.
Figure 24A:
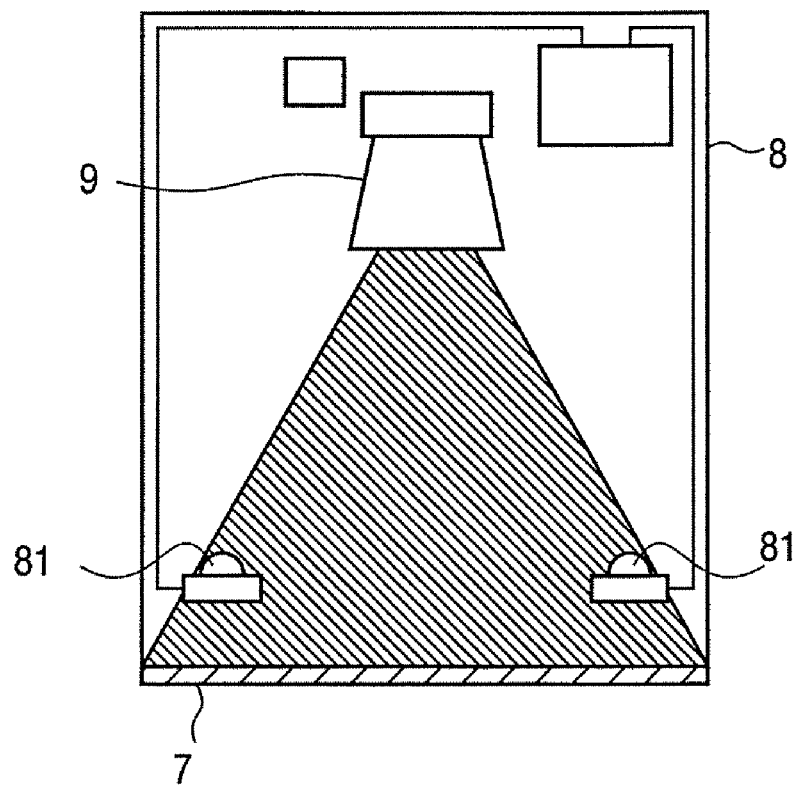
FIGS. 24A and 24B are views that show an outline of the configuration of a conventional rear projection type display apparatus.
Figure 24B:
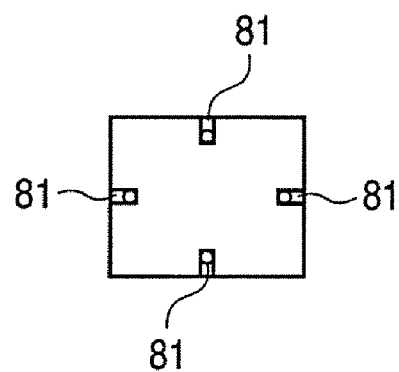
Figure 25A:
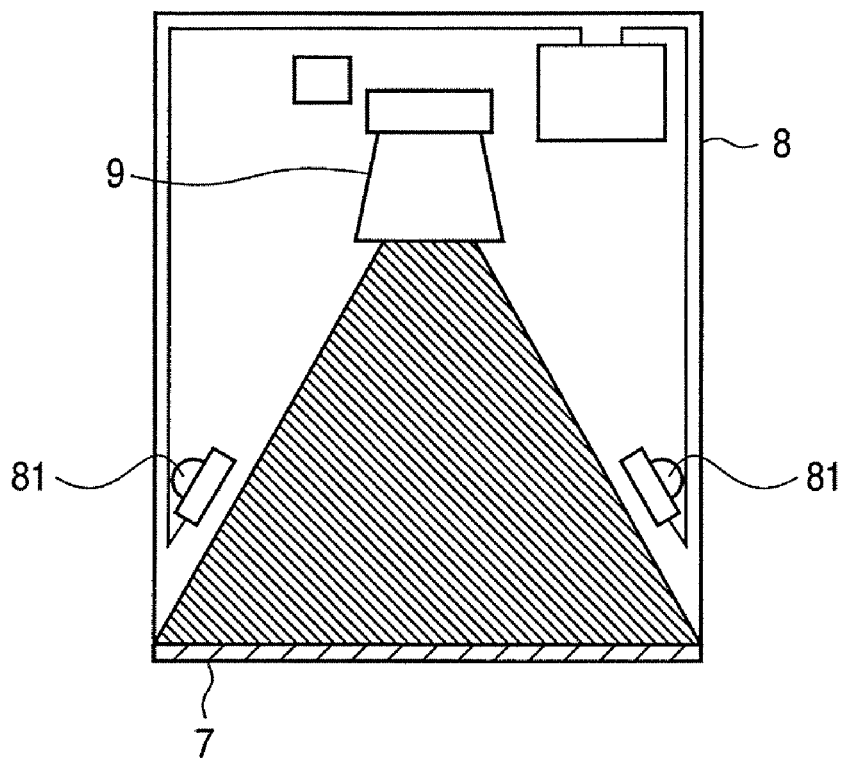
FIGS. 25A and 25B are views that show an outline of the configuration of a conventional rear projection type display apparatus.
Figure 25B:
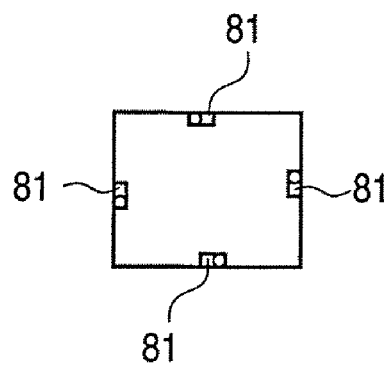

Similarly to the sixth embodiment, although the overall configuration is the same as that shown in FIG. 16, the display (screen) unit configuration is the same as that shown in FIG. 17, and the sensor configuration is the same as the apparatus configuration shown in FIG. 18, the circuit configuration is different. Hereunder, to simplify the description, a case is assumed in which a circular chart in an input image, for example, moves to the right as shown in FIG. 21D. For example, because of the movement of the circular chart in FIG. 21D, in addition to the non-measurable points 1C and 2C shown in the sixth embodiment, the data obtained at the points 1B and 3B cannot be used as measurement data.

The circuit configuration according to the present embodiment is shown in FIG. 22. In the circuit configuration diagram shown in FIG. 22, an image signal is input from the image signal input unit 101. Next, similarly to the sixth embodiment, the image signal is supplied to the display image signal processing unit 102 and input to the subsequent luminance and color correction unit 120 to undergo luminance and color correction, and is then supplied as a display image signal to the image display unit 103 and displayed. Meanwhile, the display image signal processing unit 102 outputs image signals for red (R), green (G), and blue (B) for input into the judgment position image extracting unit 122. The judgment position image extracting unit 122 makes a judgment as to whether or not photometry can be performed by each of the photometric sensors 82 based on the input image signals for red (R), green (G), and blue (B). At the same time, the display image signal processing unit 102 outputs the image signals for red (R), green (G), and blue (B) for input to a movement detection unit 123. Although not illustrated in the drawings, the internal configuration of the movement detection unit 123 comprises at least a frame memory circuit and an interframe image comparison circuit (subtraction function). With respect to the input image signal, the movement detection unit 123 stores the image of the preceding one frame and reproduces the frame from the frame memory. By detecting a differential value between the preceding one frame and the input image signal using the interframe image comparison circuit, a change in the image, that is, a movement, is detected. In this connection, with respect to the comparison frame period for movement detection, detection may be performed over a plurality of frames. A movement detection signal that is detected is supplied to a judgment image extracting unit 124.

At the judgment image extracting unit 124 shown in FIG. 22, a section for which there is a change in an image signal inside a detection region of the photometric sensor 82 is removed from the image signal. Simultaneously thereto, a movement portion of an image that is detected at the movement detection unit 123, that is, a portion corresponding to a photometric area for which there is a temporal change is also removed from the image signal.

Regarding the chart shown in FIG. 21D, the image data for each of the points 0A to 5A, 0B, 2B, 4B, 5B, 0C, 3C to 5C, and 0D to 5D is supplied to the measurement data and judgment image comparison unit 121. Further, measurement data sent to the measurement data processing unit 106 from the measurement sensor unit is input into another input terminal of the measurement data and judgment image comparison unit 121.

The measurement data from the measurement data processing unit 106 includes a delay time until an image is displayed and a sensor switching measurement delay time that is produced by the sensors 82, the measuring circuit 81 and switching circuits 76 and 77 and the like. The measurement data and judgment image comparison unit 121 comprises a memory for retaining a time delay for n frames for movement detection, the period of a time difference in the time delay until the aforementioned sensor output, and measurement data, and retains the measurement data using the memory. The measurement data and judgment image comparison unit 121 compares luminance and chromaticity data of signal components for red (R), green (G), and blue (B) with luminance and chromaticity data. In this case, the luminance and chromaticity data of signal components for red (R), green (G), and blue (B) is data for the valid sample (measurement) points of the display image from the judgment image extracting unit 124. Further, the other luminance and chromaticity data is data derived from measurement data from the measurement data processing unit 106. Based on this comparison, as shown in FIG. 21D, for each of the points 0A to 5A, 0B, 2B, 4B, 5B, 0C, 3C to 5C, and 0D to 5D, comparison data is derived sequentially by arithmetic processing or circuit processing. This comparison data is then supplied to the correction signal generating unit 105. The correction signal generating unit 105 comprises a correction data memory that stores correction data for performing correction of the screen as described above in at least sensor units. When the measurement data of a measurement sensor is judged as valid, the correction data of the corresponding addresses of the correction data memory are rewritten in sequence. Further, the correction signal generating unit 105 supplies luminance and color correction signals that are generated, for example, by subjecting data between each point and data between tones to interpolation processing to the luminance and color correction unit 120 to correct the luminance, colors, tones, white balance and the like of the display image.

According to the configuration of the present embodiment as described above, even when there is a movement in an input image signal the movement can be detected based on an interframe comparison to extract points at which measurement data is constant. The data at points at which the measurement data is constant is compared with an input image signal as valid correction signal data, and that comparison signal is supplied to the correction signal generating unit 105. At the correction signal generating unit 105, a correction signal is generated based only on a valid comparison signal. The correction signal is then supplied to the luminance and color correction unit 120 to perform correction, and the image is displayed on the image display unit 103 using the corrected display conditions. Thus, according to the configuration of the present embodiment, even when there is a movement in an input image signal, only data that is effective for correction relating to the display characteristics is detected. The measurement data of the measuring point is then compared with the luminance value and the like that should be displayed by the input image signal, to enable correction relating to the display characteristics.

Eighth Embodiment

Although in the sixth and seventh embodiments cases were described in which a display image is shown in a comparatively plain chart as shown in FIGS. 21A or 21D, in many cases an image that is actually input involves more minute patterns and noise and the like. For example, there are many cases in which the luminance, brightness, chromaticity and the like vary minutely in a spatial direction in an actual image. According to the present embodiment a configuration is described in which correction relating to image display characteristics can be performed in normal usage even when an input image involves minute patterns.

FIG. 23 is a circuit configuration diagram showing the circuit configuration for correcting display characteristics according to the present embodiment. In comparison with the circuit configuration of the seventh embodiment shown in FIG. 22, in the circuit configuration shown in FIG. 23 an averaging processing unit 125 is additionally provided between the display image signal processing unit 102, the judgment position image extracting unit 122, and the movement detection unit 123. The averaging processing unit 125 detects variation values in an input image signal, and when variations in the image or less than or equal to a constant value the averaging processing unit 125 performs averaging processing for the image signal. The averaging processing is performed for the horizontal direction and vertical direction of the image signal, and the processed image signal is supplied to the subsequent judgment position image extracting unit 122 and movement detection unit 123. In this connection, detection of variation values in an image signal can be carried out, for example, on the basis of whether or not the distribution of parameters such as the frequency and the intensity of a light signal in a detectable region of a sensor is biased. More specifically, for example, the variance or standard deviation of the parameter distribution in a detectable region of a sensor is calculated. If that value is less than or equal to a predetermined value, it can be judged that distribution of the parameters is biased and, accordingly, variations in the image are less than or equal to a constant value.

At the judgment position image extracting unit 122 and the movement detection unit 123, movement detection and extraction of image signals at positions with no variations among the judgment image positions is performed with respect to stable signals for which signal components in which variations in the level of an image signal were less than or equal to a constant value were subjected to averaging. Next, a comparison operation is performed by the measurement data and judgment image comparison unit 121. Meanwhile, with respect to photometric data at the photometric sensors 82, minute noise components or variations in the horizontal and vertical direction of the display image are originally handled as averaged data. More specifically, the individual photometric sensor 82 is a device for handling a photometric integrated value of the relevant measurable area, i.e., a two-dimensional region within the region of a photometric area represented by a square frame as shown in FIG. 21B, with respect to the horizontal direction and the vertical direction. The measurement data is input to a measurement data input side of the measurement data and judgment image comparison unit 121 through the measurement data processing unit, and the measurement data and judgment image comparison unit 121 performs a comparison operation as described above. Valid correction data values are stored in sequence at the correction signal generating unit 105, and correction of the image signal is performed by the luminance and color correction unit 120 that performs interpolation for correction data between each measurement area and interpolation in a tone direction and the like. The display image of the image display unit 103 is then corrected to enable appropriate correction of the luminance, colors, tones, and white balance of the projection image at the screen unit 7 based on the sequential measurement data.

Thus, according to the configuration of the present embodiment, when signals in input image signals have noise components or minute patterns or the like, averaging processing of the image signals that performs a data comparison is carried out. For a signal with variations that are more than a constant value, control is performed so that the signal in question is not used as data for performing correction relating to image display characteristics. Thus, according to the configuration of the present embodiment, even when an input image signal contains noise components or minute patterns, it is possible to perform appropriate correction relating to the image display characteristics.

Ninth Embodiment

Although the sixth to eighth embodiments described configurations in which a plurality of photometric sensors are provided at internal positions at which projection images for projection onto the screen 7 of the rear projection display apparatus are not formed in a direct manner, a photometry method is not limited thereto. For example, a configuration may be adopted in which photometry is performed using a CCD sensor or a CMOS sensor such as a television camera, and a measurement (photometric) signal is extracted for each measurement area for use as measurement data of the measurement data processing unit 106. In this case, a screen image can be subjected to photometry in a direct manner at a suitable position. Similarly to the configurations according to the sixth to eight embodiments, in this type of configuration correction relating to the display characteristics of an image can be performed during use relating to a normal image display. Further, in the configurations according to the first to fifth embodiments also, measurement can also be performed using a CMOS sensor or a CCD sensor, and not only a normal photodiode.

As described above, according to the present invention technology can be provided that, for a rear projection type display apparatus, measures color reproduction characteristics and luminance for arbitrary positions on a display screen to enable control of the display characteristics based on that measurement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-129680, filed May 8, 2006, which is hereby incorporated by reference herein in its entirety.

What is claimed is:

1. A rear projection type display apparatus, comprising:
    an output unit that modulates light emitted from a light source to output projection light;
    an image formation unit that has one or more optical elements, and that guides the projection light to form an image;
    a Fresnel screen that receives the projection light from the image formation unit and displays the projection light as the image;
    a light detection unit that is disposed in the vicinity of the Fresnel screen so as to be irradiated by the projection light, and that detects rays of the projection light; and
    a control unit that controls an output of the projection light by the output unit based on the rays that are detected at the light detection unit, wherein the light detection unit includes a plurality of light detecting elements; and the light detecting elements are disposed on an inside of the Fresnel screen in a grid shape and are substantially parallel with the Fresnel screen.

2. The rear projection type display apparatus according to claim 1, wherein the control unit performs correction control of the projection light based on the rays that are detected by the light detection unit, and
    wherein the rays that are detected are uniform in a detectable region of the detection unit.

3. The rear projection type display apparatus according to claim 1, wherein,
    the control unit, on the basis of an image signal obtained by averaging the rays that are detected by the light detection unit for which a variation value of image signals corresponding to the rays that are detected in a detectable region of the light detection unit is less than a predetermined value, performs a comparison with photometric values and performs correction control for the display signal based on the comparison result.

4. The rear projection type display apparatus according to claim 1, wherein,
    the control unit comprises a movement detection unit that detects a movement in an input image signal; and
    with regard to an image area of the input image signal in which the movement is not detected by the movement detection unit, the control unit compares display data of the input image signal and display data of a display image on the basis of data that is input from a measurement data processing unit and data that is input from a judgment image extracting unit, and performs correction control for the display signal based on the comparison result.

5. The rear projection type display apparatus according to claim 1, wherein the light detection unit includes a plurality of minute light detection units that are disposed in a grid shape and are substantially parallel with the Fresnel screen.

* * * * *